US00RE50791E

(19) United States
(12) Reissued Patent
Kurras et al.

(10) Patent Number: US RE50,791 E
(45) Date of Reissued Patent: Feb. 10, 2026

(54) BASE STATION, WIRELESS COMMUNICATIONS NETWORK AND METHODS FOR OPERATING THE SAME

(71) Applicant: Fraunhofer-Gesellschaft zur Förderung der angewandten Forschung e.V., Munich (DE)

(72) Inventors: Martin Kurras, Berlin (DE); Lars Thiele, Berlin (DE); Markus Landmann, Erlangen (DE); Marcus Großmann, Erlangen (DE); Niels Hadaschik, Erlangen (DE); Norbert Franke, Erlangen (DE)

(73) Assignee: FRAUNHOFER-GESELLSCHAFT ZUR FÖRDERUNG DER ANGEWANDTEN FORSCHUNG E.V., Munich (DE)

(21) Appl. No.: 18/195,218

(22) Filed: May 9, 2023

Related U.S. Patent Documents

Reissue of:
(64) Patent No.: 11,006,246
Issued: May 11, 2021
Appl. No.: 16/535,652
Filed: Aug. 8, 2019

U.S. Applications:
(63) Continuation of application No. PCT/EP2018/052426, filed on Jan. 31, 2018.

(30) Foreign Application Priority Data

Feb. 14, 2017 (EP) ..... 17155982

(51) Int. Cl.
*H04W 24/00* (2009.01)
*G01S 5/02* (2010.01)
(Continued)

(52) U.S. Cl.
CPC ..... *G01S 5/02* (2013.01); *H04L 5/005* (2013.01); *H04W 4/029* (2018.02); *H04W 16/28* (2013.01); *H04W 64/00* (2013.01); *H04W 88/02* (2013.01)

(58) Field of Classification Search
CPC ... H04W 16/28; H04W 64/00; H04W 72/046; H04W 84/18; H04W 4/029
See application file for complete search history.

(56) References Cited

U.S. PATENT DOCUMENTS 6,871,061 B1 3/2005 Koorapaty et al.
7,174,172 B2 2/2007 Sharony et al.
(Continued)

FOREIGN PATENT DOCUMENTS

CN 101129078 A 2/2008
CN 103228041 A 7/2013
(Continued)

OTHER PUBLICATIONS

Extended European Search Report dated Jul. 12, 2024, issued in application No. EP 24160971.8.
(Continued)

*Primary Examiner* — Matthew E Heneghan
(74) *Attorney, Agent, or Firm* — McClure, Qualey & Rodack, LLP

(57) ABSTRACT

A base station is configured to control a wireless communication network cell of a wireless communication network and is configured to use a coarse position information related to a coarse position of a user equipment to determine a direction towards the user equipment. The base station is configured to transmit a positioning signal to the user equipment and to direct the transmission of the positioning signal towards the user equipment. The positioning signal is
(Continued)

adapted to allow for a determining of a fine position information relating to the user equipment.

39 Claims, 12 Drawing Sheets

(51) Int. Cl.

| | |
|---|---|
| ***H04L 5/00*** | (2006.01) |
| ***H04W 4/029*** | (2018.01) |
| ***H04W 16/28*** | (2009.01) |
| ***H04W 64/00*** | (2009.01) |
| *H04W 88/02* | (2009.01) |

(56) References Cited

U.S. PATENT DOCUMENTS

| | | | | |
|---|---|---|---|---|
| 8,489,123 | B2 * | 7/2013 | Spencer | G01S 19/21 370/336 |
| 8,897,801 | B2 | 11/2014 | Burroughs et al. | |
| 9,723,437 | B1 * | 8/2017 | Bitra | H04W 64/00 |
| 10,107,891 | B1 * | 10/2018 | Ngo | G01S 5/0289 |
| 2003/0100314 | A1 | 5/2003 | Czaja et al. | G01S 5/0027 455/456.1 |
| 2006/0194587 | A1 | 8/2006 | Sharony et al. | G01S 5/06 455/456.1 |
| 2009/0006656 | A1 | 1/2009 | Yanagi | |
| 2011/0059755 | A1 * | 3/2011 | Kim | H04W 64/00 455/456.3 |
| 2011/0205969 | A1 | 8/2011 | Ahmad et al. | H04W 16/28 370/328 |
| 2012/0113795 | A1 * | 5/2012 | Ko | H04L 5/0051 370/209 |
| 2012/0231803 | A1 * | 9/2012 | Soliman | G01S 1/0423 455/450 |
| 2012/0302254 | A1 | 11/2012 | Charbit | |
| 2012/0326929 | A1 * | 12/2012 | Belloni | G01S 1/24 342/386 |
| 2013/0314104 | A1 | 11/2013 | Lammel et al. | |
| 2014/0120947 | A1 * | 5/2014 | Siomina | G01S 5/02213 455/456.1 |
| 2014/0155104 | A1 * | 6/2014 | Jarvis | G01S 5/14 455/456.5 |
| 2014/0171097 | A1 * | 6/2014 | Fischer | G01S 5/0242 455/456.1 |
| 2015/0105097 | A1 | 4/2015 | Sun et al. | |
| 2015/0156637 | A1 * | 6/2015 | Li | G01S 1/725 455/454 |
| 2015/0188678 | A1 | 7/2015 | Wu et al. | G01S 1/14 455/456.6 |
| 2016/0018508 | A1 * | 1/2016 | Chen | G01S 5/0252 455/456.1 |
| 2016/0234709 | A1 | 8/2016 | Fischer | H04W 64/00 |
| 2016/0291128 | A1 | 10/2016 | Persson | |
| 2017/0276761 | A1 * | 9/2017 | Park | G01S 5/0236 |
| 2018/0310283 | A1 * | 10/2018 | Deenoo | H04W 72/046 |

FOREIGN PATENT DOCUMENTS

| | | | |
|---|---|---|---|
| CN | 105850055 | A | 8/2016 |
| CN | 106093954 | A | 11/2016 |
| JP | 2007218868 | A | 8/2007 |
| JP | 2015185953 | A | 10/2015 |
| JP | 2016001188 | A | 1/2016 |
| JP | 2016025387 | A | 2/2016 |
| JP | 2017501375 | A | 1/2017 |
| KR | 1020120139752 | A | 12/2012 |
| KR | 1020150077469 | A | 7/2015 |
| RU | 2464589 | C2 | 10/2011 |
| TW | 201640932 | A | 11/2016 |
| WO | 2009/152475 | A1 | 12/2009 |
| WO | 2012081861 | A2 | 6/2012 |
| WO | 2014064656 | A2 | 5/2014 |
| WO | 2015141066 | A | 9/2015 |
| WO | 2016153253 | A1 | 9/2016 |
| WO | 2017023483 | A1 | 2/2017 |

OTHER PUBLICATIONS

Russian Office Action dated May 28, 2020, issued in application No. 2019128832/07.

English language translation of Russian Office Action dated May 28, 2020, issued in application No. 2019128832/07.

3GPP TS 36.355 V13.1.0, 3rd Generation Partnership Project; Technical Specification Group Radio Access Network; Evolved Universal Terrestrial Radio Access (E-UTRA); LTE Positioning Protocol (LPP) (Release 13), Mar. 2016.

3GPP TS 36.455 V13.1.0, 3rd Generation Partnership Project; Technical Specification Group Radio Access Network; Evolved Universal Terrestrial Radio Access (E-UTRA); LTE Positioning Protocol A (LPPa) (Release 13), Mar. 2016.

3GPP TR 37.857 V13.1.0, 3rd Generation Partnership Project; Technical Specification Group Radio Access Network; Study on indoor positioning enhancements for UTRA and LTE (Release 13), Dec. 2015.

EENA, "EENA Position Paper on the provision of mobile callerlocation information in the context of calls to the European emergency No. 112", European Emergency Number Association, Dec. 2010.

3GPP TS 36.211 V13.0.0, 3rd Generation Partnership Project;Technical Specification Group Radio Access Network; Evolved Universal Terrestrial Radio Access (E-UTRA); Physical channels and modulation (Release 13), Dec. 2015.

International Search Report and Written Opinion, Patent Cooperation Treaty, International Application No. PCT/EP2018/052426, dated Apr. 10, 2018, pp. 1-14.

English Translation of Korean Office Action dated Jul. 15, 2020, issued in patent application No. 2019-7026638.

Indian Office Action, dated Nov. 25, 2020, in application No. 201917032812.

Office Action, dated Oct. 13, 2020, in the parallel Japanese patent application No. 2019-564582.

English Translation of Office Action, dated Oct. 13, 2020, in the parallel Japanese patent application No. 2019-564582.

Chinese Office Action dated Jun. 2, 2020, issued in patent application No. 201880025122.2.

* cited by examiner

BASE STATION, WIRELESS COMMUNICATIONS NETWORK AND METHODS FOR OPERATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of copending International Application No. PCT/EP2018/052426, filed Jan. 31, 2018, which is incorporated herein by reference in its entirety, and additionally claims priority from European Application No. EP 17155982.6, filed Feb. 14, 2017, which is also incorporated herein by reference in its entirety.

The present invention concerns the field of wireless communications networks or systems, more specifically, a base station, a method for operating the same, a wireless communications network and a method for operating the same. The present invention further concerns beam forming-assisted localization in mobile cellular communications systems.

BACKGROUND OF THE INVENTION

In current mobile communications networks, localization may be based on Positioning Reference Signals (PRS) sequences transmitted in the Physical Downlink Shared CHannel (PDSCH), as described in [1, 2]. Multiple User Equipment (UE) may use the PRS sequences for an estimation of a Time Difference of Arrival (TDoA), as described in [3].

SUMMARY

An embodiment may have a base station configured to control a wireless communications network cell of a wireless communications network; wherein the base station is configured to use a coarse position information related to a coarse position of an user equipment to determine a direction towards the user equipment; wherein the base station is configured to transmit a positioning signal to the user equipment and to direct the transmission of the positioning signal towards the user equipment; wherein the positioning signal is adapted to allow for a determining of a fine position information relating to the user equipment.

According to another embodiment, a wireless communications network may have: a first inventive base station and a second inventive base station, wherein the first base station is configured to transmit a first positioning signal and wherein the second base station is configured to transmit a second positioning signal, a user equipment; wherein the first base station and second base station are configured to coordinately use a beamforming technique for transmitting the first and second positioning signal.

According to another embodiment, a method for operating a base station controlling a wireless communications network cell of a wireless communications network may have the steps of: using a coarse position information related to a coarse position of an user equipment to determine a direction towards the user equipment; transmitting a positioning signal to the user equipment, the positioning signal adapted to allow for a determining of a fine position information relating to the user equipment, and directing the transmission of the positioning signal towards the user equipment for determining a fine position information relating to the user equipment.

According to another embodiment, a method for operating a wireless communications network may have the steps of: operating a user equipment in the wireless communications network; operating a first inventive base station and operating a second inventive base station so as to coordinately using a beamforming technique for transmitting the first and second positioning signal.

Another embodiment may have a non-transitory digital storage medium having a computer program stored thereon to perform the inventive methods when said computer program is run by a computer.

The inventors have found out that by transmitting a positioning signal into a direction towards the user equipment in which the position is to be determined, i.e., with a higher signal power in the direction towards the UE or when compared to a different direction, determination of the position may be enhanced. Enhancement may be obtained in view of a higher precision and/or in view of a higher number of user equipment that may receive the positioning signal. The directioning may allow for a high signal power and/or a high Signal to Noise Ratio of Line of Sight Paths at the user equipment and may thus allow for the enhancement.

According to an embodiment, a base station is configured to control a wireless communications network cell of a wireless communications network. The base station is configured to use a coarse position information related to a coarse position of a user equipment. For determining a fine position information relating to the user equipment, the base station is configured to transmit a positioning signal to the user equipment and to direct the transmission of the positioning signal towards the user equipment. The base station is configured to receive a response signal from the user equipment, the response signal comprising data related to the positioning signal and indicating a parameter of reception of the positioning signal. The base station is configured to provide the parameter of reception of the sequence to a calculator for determining the fine position information. The calculator may be located at the base station, a different base station or a further network node such as a location server. Directing the transmission of the positioning signal towards the user equipment may allow for a high signal power of the positioning signal at the user equipment and may thus allow for a high precision of determining the localization and/or may allow for a signal power level being high enough for being received and detected by the user equipment.

According to an embodiment, the parameter of reception is related to at least one of a time of arrival of the positioning signal, a time difference of arrival of a multitude of positioning signals and/or to a direction of arrival of the positioning signal. This may allow for precise localization of the user equipment.

According to an embodiment, the base station is configured to receive the coarse position information from a location server of the wireless communications network or from a further base station. This may allow for using actual coarse position information so as to direct the positioning signal to an actual position of the user equipment. According to an embodiment, the base station is configured to receive a signal from the user equipment comprising a position information, wherein the base station is configured to use the received position information as the coarse information. The position information received by the user equipment may contain information, for example, being obtained by localization services of the user equipment, for example, based on a satellite positioning system. This may allow for a precise directing of the positioning signal towards the user equipment.

According to an embodiment, the user equipment is a first user equipment. The base station is configured to serve the first and a second user equipment. The base station is further configured to exclude a direction towards a second user equipment and/or a direction towards a further base station from the direction of the positioning signal. This may allow for a low interference at the second user equipment and/or at the further base station. According to an embodiment, the base station is configured to repeat determining of the position of the user equipment in subsequent steps. The base station is configured to use the fine position information of the user equipment determined in a first step as coarse position information in a second step following the first step. This may allow for a subsequent increase of accuracy of the respective fine position information.

According to an embodiment, the base station is configured to direct the positioning signal using a beam forming technique. The base station is configured to reduce a width of a second beam used in the second step when compared to a width of a first beam used in the first step. Thus, the width of the beam may be reduced iteratively. This may allow for a subsequent increase of signal power at the user equipment and/or for a subsequent reduction of interfering signals aside the user equipment.

According to an embodiment, the base station is configured to receive a control information from the user equipment and to direct the transmission of the positioning signal towards the user equipment responsive to the control information so as to implement a first transmission pattern. The base station is configured to transmit the positioning signal according to a second transmission pattern in absence of the control information. This may allow to direct the positioning signal towards the user equipment when needed or requested by the user equipment and to use a different pattern when such a requirement is not signalized.

According to an embodiment, the user equipment is a first user equipment and the positioning signal is a first positioning signal. The base station is configured to transmit the first positioning signal so as to comprise a first sequence of a plurality of predetermined sequences for positioning signals. The base station is configured to transmit a second positioning signal comprising a second sequence of the plurality of sequences in a direction of a second user equipment whilst not transmitting the second positioning signal into a direction of the first user equipment. This may allow for avoiding interference, in particular inter-sequence interference. Beamforming individual sequences to individual user equipment may allow for a high number of addressed user equipment, for example, at a same time.

According to an embodiment, a wireless communications network comprises a first base station and a second base station according to embodiments described herein and comprises a user equipment. The first base station and the second base station are configured to coordinately use a beam forming technique for transmitting the first and second positioning signal. This may allow to further increase the signal power at the user equipment when receiving the positioning signals transmitted by different base stations.

According to an embodiment, a method for operating a base station controlling a wireless communications network cell of a wireless communications network comprises using a coarse position information related to a coarse positon of a user equipment. The method comprises transmitting a positioning signal to the user equipment and directing the transmission of the positioning signal towards the user equipment for determining a fine position information relating to the user equipment. The method comprises receiving a response signal from the user equipment, the response signal comprising data related to the positioning signal and indicating a parameter of reception of the positioning signal. The method comprises providing the parameter of reception of the sequence to a calculator for determining the fine position information.

Further embodiments provide a method for operating a wireless communications network. The method comprises operating a user equipment in the wireless communications network and comprises operating a first base station and operating a second base station according to embodiments described herein. The method comprises operating the first and second base station so as to coordinately use a beam forming technique for transmitting the first and second positioning signal.

Further embodiments relate to a non-transitory computer program product comprising a computer readable medium storing instructions which, when executed on a computer, carry out methods according to embodiments described herein.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
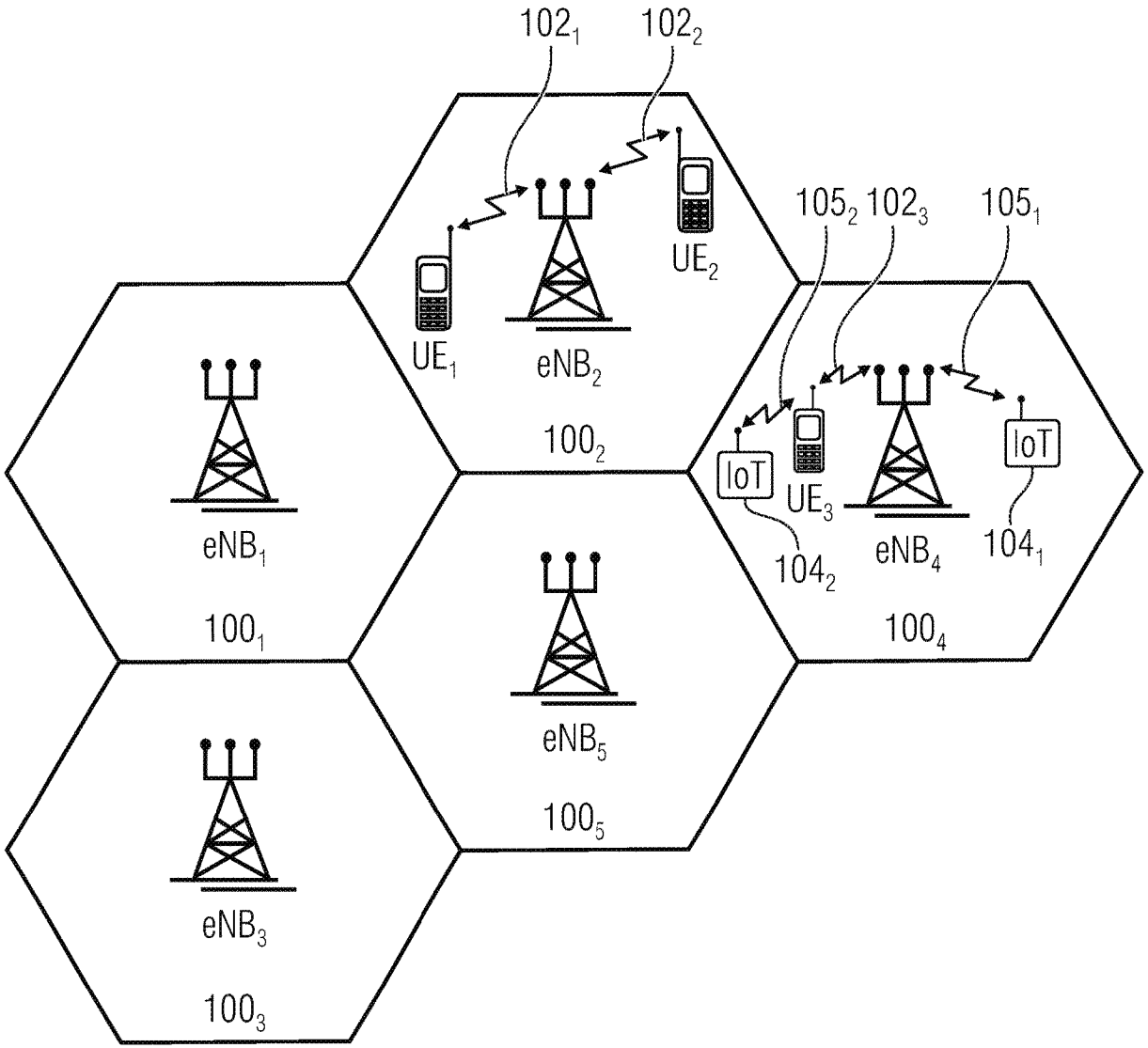
FIG. 1 is a schematic representation of an example network infrastructure according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described hereinafter may refer to a base station operating at least a wireless communications network cell of a wireless communications network. Reference is made hereinafter to wireless communications networks operating according to LTE (long term evolution). Description in connection with embodiments described herein and relating to LTE may also relate to other mobile communication networks, for example operated according to 5 G/new radio or the like, without limitation. One aspect of embodiments described herein is based on determining or at least influencing a direction into which signals are transmitted. This may be obtained, for example, when using a beam forming technique. Benefits by using beam forming techniques or other techniques for influencing the direction of a signal may also be obtained in communication standards different from LTE.

Although embodiments described herein refer to user equipment that are operated in a wireless communications network, embodiments may also refer to IoT devices. IoT devices may include physical devices, vehicles, buildings and other items having embedded therein electronics, software, sensors, actuators, or the like as well as network connectivity that enable these devices to collect and exchange data across an existing network infrastructure. FIG. 1 is a schematic representation of an example of such a network infrastructure, like a wireless communication system including a plurality of base stations $eNB_1$ to $eNB_5$, each serving a specific area surrounding the base station schematically represented by the respective cells $\mathbf{100}_1$ to $\mathbf{100}_5$. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users $UE_1$ and $UE_2$, also referred to as user equipment (UE), that are in cell $\mathbf{100}_2$ and that are served by base station $eNB_2$. Another user $UE_3$ is shown in cell $\mathbf{100}_4$ which is served by base station $eNB_4$. The arrows 102, $\mathbf{102}_2$ and $\mathbf{102}_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $\mathbf{104}_1$ and $\mathbf{104}_2$ in cell $\mathbf{100}_4$, which may be stationary or mobile devices. The IoT device $\mathbf{104}_1$ accesses the wireless communication system via the base station $eNB_4$ to receive and transmit data as schematically represented by arrow $\mathbf{105}_1$. The IoT device $\mathbf{104}_2$ accesses the wireless communication system via the user $UE_3$ as is schematically represented by arrow $\mathbf{105}_2$. When compared to a UE, an IoT device may access a channel, for example, less frequent and/or using a lower bandwidth but may elsewise be a further network node in view of requesting a channel access or the like.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), may be used.

Standard LTE devices, like the users $UE_1$, $UE_2$, $UE_3$, operate within a first bandwidth, and the IoT devices $\mathbf{104}_1$ and $\mathbf{104}_2$ may operate within a second bandwidth which is narrower than the first bandwidth. The second bandwidth may be defined in accordance with the NB-IoT enhancement of the LTE Rel. 13 standard, referred to in the following also as NB-IoT. A wireless communication system operating in accordance with the LTE standard may have a system bandwidth of 1.4 MHz, 3.0 MHz, 5 MHz, 10 MHz, 15 MHz, 20 MHz or aggregated system bandwidth consisting of any combination of these, and the bandwidth in accordance with the NB-IoT enhancement of the LTE Rel. 13 standard may be by 200 kHz.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

Figure 2A:
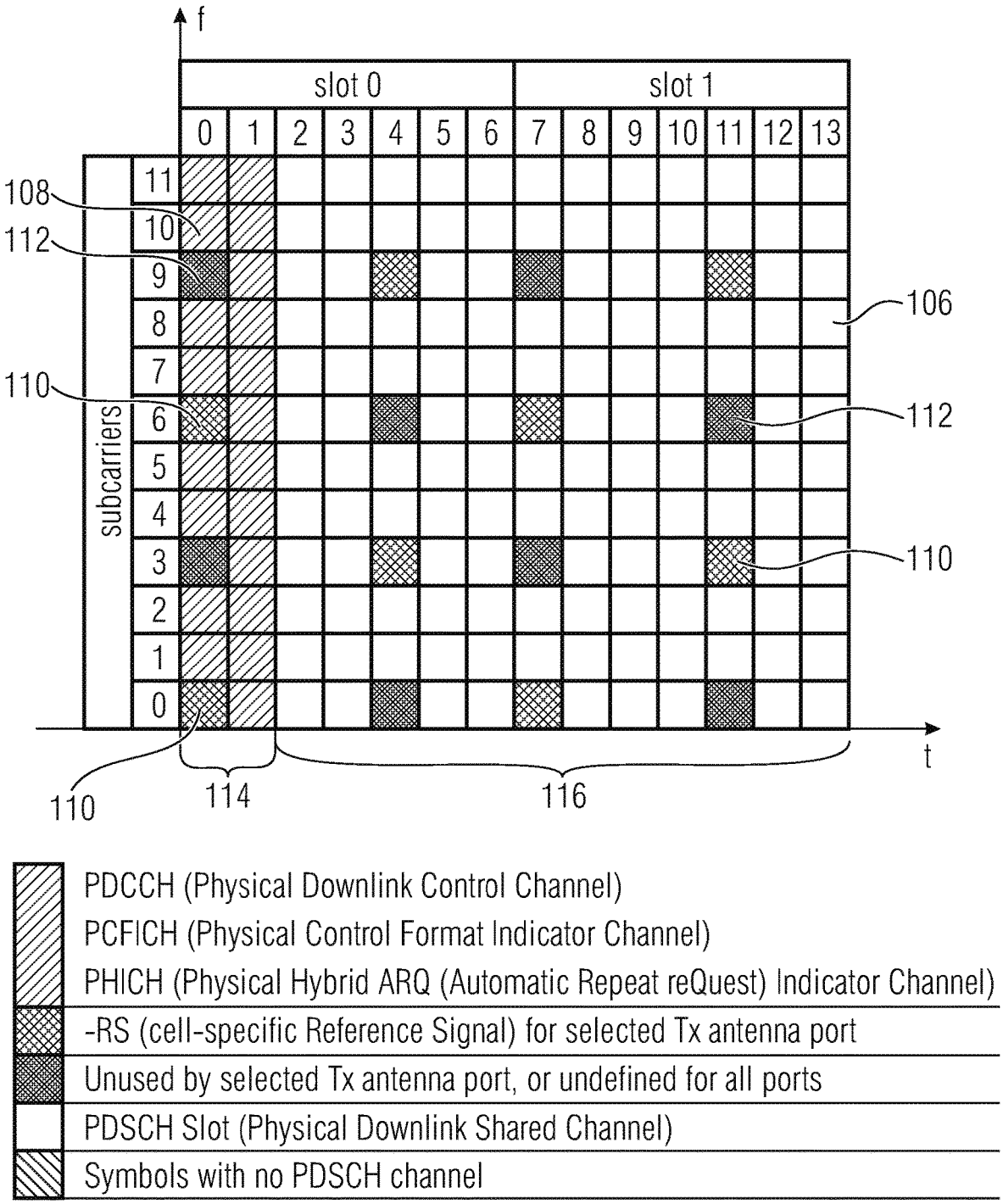
FIG. 2a shows an exemplary LTE OFDMA-based subframe with two antenna ports for different selected Tx antenna ports according to an embodiment.

FIG. 2a shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. One or more resource elements of the PDSCH may be used for transmission of Positioning Reference Signals (PRS). PRS may be used to determine a position of a user equipment and/or an IoT device. The resource elements for the physical control channels (including non-payload or non-user data), also referred to the control region, are represented by the hatched boxes 108. In accordance with examples, resource elements 108 may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port. The resource elements 108, 110, 112 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2a may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data.

Figure 2B:
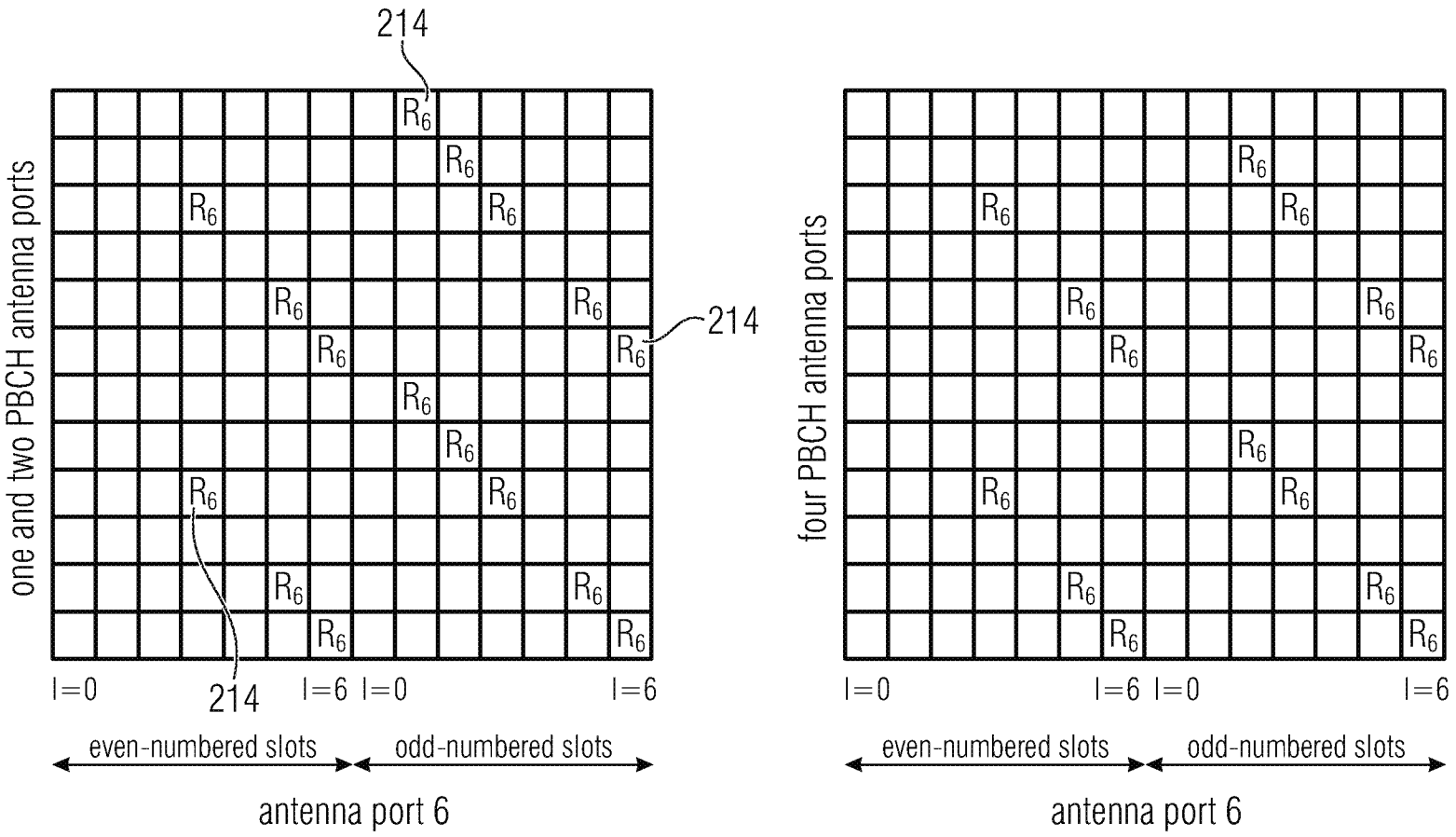
FIG. 2b shows a schematic diagram of a mapping of PRS sequences.

FIG. 2b shows a schematic diagram of a mapping of PRS sequences as described in [6]. Positioning reference signals are to be transmitted in resource blocks in downlink subframes that are configured for positioning reference signal transmission. If both normal and MBSFN (Muto-broadcast single-frequency network) subframes are configured as positioning subframes within a cell, the OFDM symbols in a MBSFN subframe configured for positioning reference signal transmission may use the same cyclic prefix as used for subframe #0. If only MBSFN subframes are configured as positioning subframes within a cell, the OFDM symbols configured for positioning reference signals in the MBSFN region of these subframes may use extended cyclic prefix length. In a subframe configured for positioning reference signal transmission, the starting positions of the OFDM symbols configured for positioning reference signal transmission may be identical to those in a subframe in which all OFDM symbols have the same cyclic prefix length as the OFDM symbols configured for positioning reference signal transmission. Positioning reference signals may be transmitted on antenna port 6. The positioning reference signals may be mapped to resource elements different from (k, l) allocated to PBCH, PSS or SSS regardless of their antenna port p. Positioning reference signals may be defined, for example, for a specific frequency range such as f±15 kHz around a center frequency. On the left hand side, PRS are mapped for one and two PBCH antenna ports, wherein on the right hand side, four PBCH antenna ports are used. Slots 214 for transmission of PRS are marked by $R_6$ and are represented for even-numbered slots and odd-numbered slots. The bandwidth for positioning reference signals may be configured by higher layers.

Figure 3:
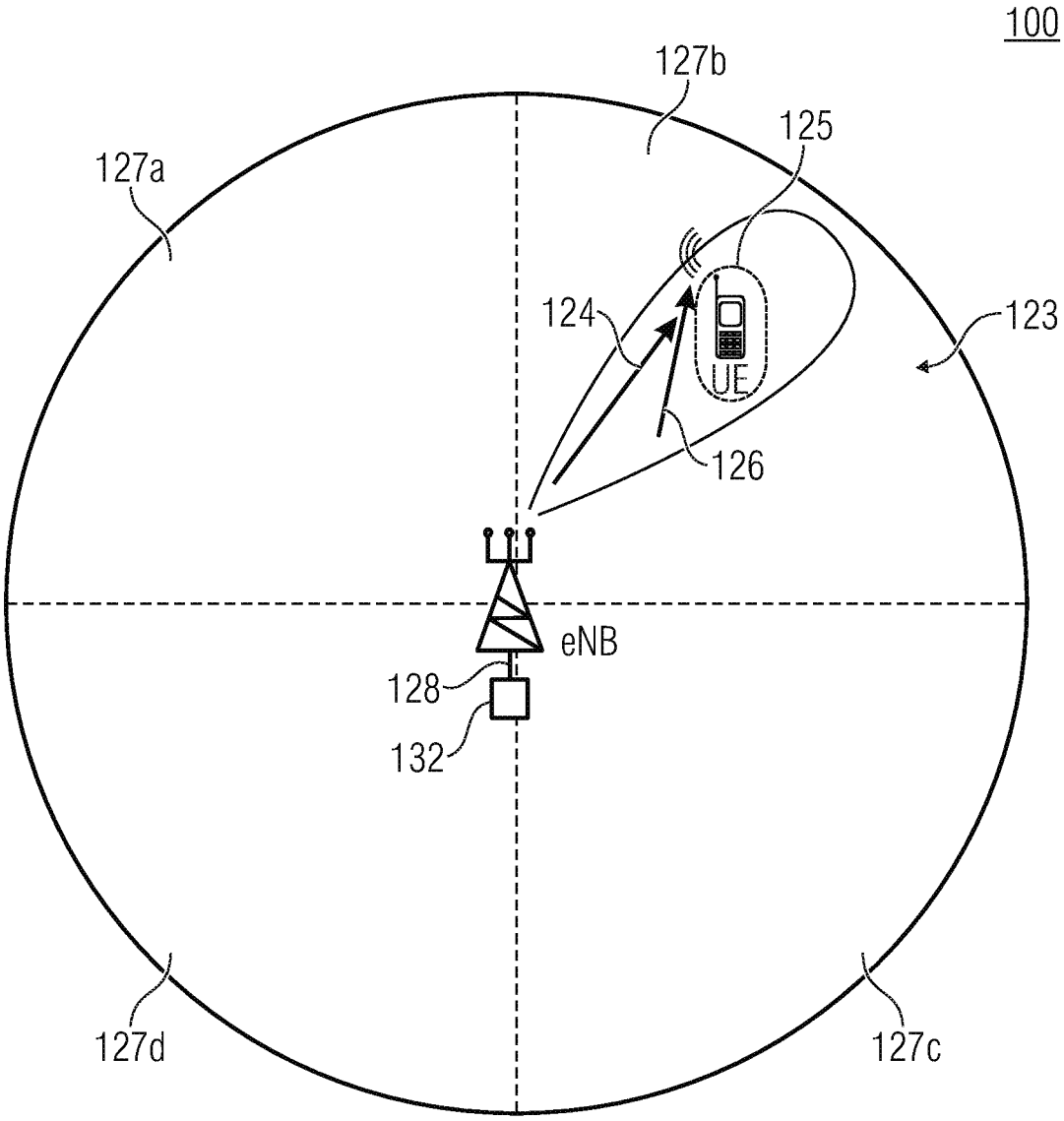
FIG. 3 shows a schematic block diagram of a base station according to an embodiment.

FIG. 3 shows a schematic block diagram of a base station eNB according to an embodiment. The eNB is configured to control a wireless communication network cell 100, for example one of the cells $\mathbf{100}_1$ to $\mathbf{100}_5$ of FIG. 1. The base station eNB is configured to use a coarse position information 123 related to a user equipment UE. The user equipment may be arranged in the wireless communications network cell 100 and may be operated by the base station eNB. As will be described later in more detail, it is possible that the UE is arranged outside the cell 100 and/or is operated by a different base station.

The coarse position information may comprise or may be an information about the coarse location or coarse position 123 of the UE in the wireless communications network cell 100 that is coarse with respect to a spatial resolution and/or a resolution in time. For example, the coarse position information may comprise information about a sector 127a-d of the cell 100 in which the user equipment is arranged or is thought to be arranged. This may include a precise information indicating the coarse position 123, wherein the precise information, the indicated coarse position 123 respectively, is afflicted with an element of uncertainty. The element of uncertainty may be, for example, positon of the UE along a coordinate such as x or y within a tolerance rage. The tolerance range may be, for example, at least 500 m, at least 100 m or at least 10 m. Alternatively or in addition, the coarse position information may be an information, that the UE is expected to be in one of the plurality of sectors 127a to 127d of the cell 100, such as the sector 127b. Alternatively or in addition, the coarse position information may be a position information that was determined previously and/or may be a region within the cell 100 or within the wireless communications network that comprises a previously known position of the UE within a tolerance range. The tolerance range may be, for example, a minimum, maximum or average velocity multiplied with a time interval since the position was known. In general terms, the coarse position information 123 may indicate a section or region within the wireless communications network cell 100 in which the UE is arranged.

The base station may be configured to at least support a localization of the UE. For example, the UE or any other network node may trigger or initiate localization of the UE. When being triggered by the UE, an application of the UE may entail a precise localization of the UE. Other services of the UE such as global navigation satellite systems, e.g., GPS, Galileo or Glonass may be inaccurate or unavailable. Based thereon, the UE may request the network to determine its position. Alternatively, the network may trigger the determination of the position of the UE, for example, in an emergency scenario.

For determining a fine position of the UE, the base station is configured to transmit a positioning signal 124 to the UE. The positioning signal may be, for example, a PRS. Alternatively, the positioning signal 124 may be a different signal allowing the user equipment to determine parameters of reception. In particular, communications standards different from LTE may name signals similar to PRS or providing for a similar function differently. For example, the base station may be configured to transmit the positioning signal 124 in a shared channel of the wireless communications network cell 100, for example a PDSCH channel. The base station eNB is configured to direct the positioning signal 124 into a direction of the coarse position 123. For example, eNB may use a beam forming technique or any other technique that allows for transmitting the positioning signal 124 into a first direction with a first, higher signal power when compared to a second direction into which the signal is transmitted with a lower signal power. For example, eNB may comprise a plurality of antennas, wherein each antenna is configured to serve a sector 127a to 127d of the cell 100. eNB may be configured to reduce the signal power or even to deactivate antennas serving sectors or a region in the cell 100 in which the user equipment is not located. In contrast, the eNB may be configured to activate or use antennas serving a region or a sector in which the user equipment is arranged, i.e., the eNB uses the coarse position information. When using a beamforming technique, the eNB may be configured to direct the positioning signal 124 towards a spot within the cell 100, i.e., beside an angle of transmission a range of the positioning signal may be influenced.

When using a beam forming technique or the like, eNB may be configured to use the coarse position information so as to securely or at least with a low error rate being below 15%, below 10% or below 5%, reach the user equipment with the positioning signal 124, i.e., the error rate may rather relate to a chance of successful transmission than to a bit error rate.

Figure 10:
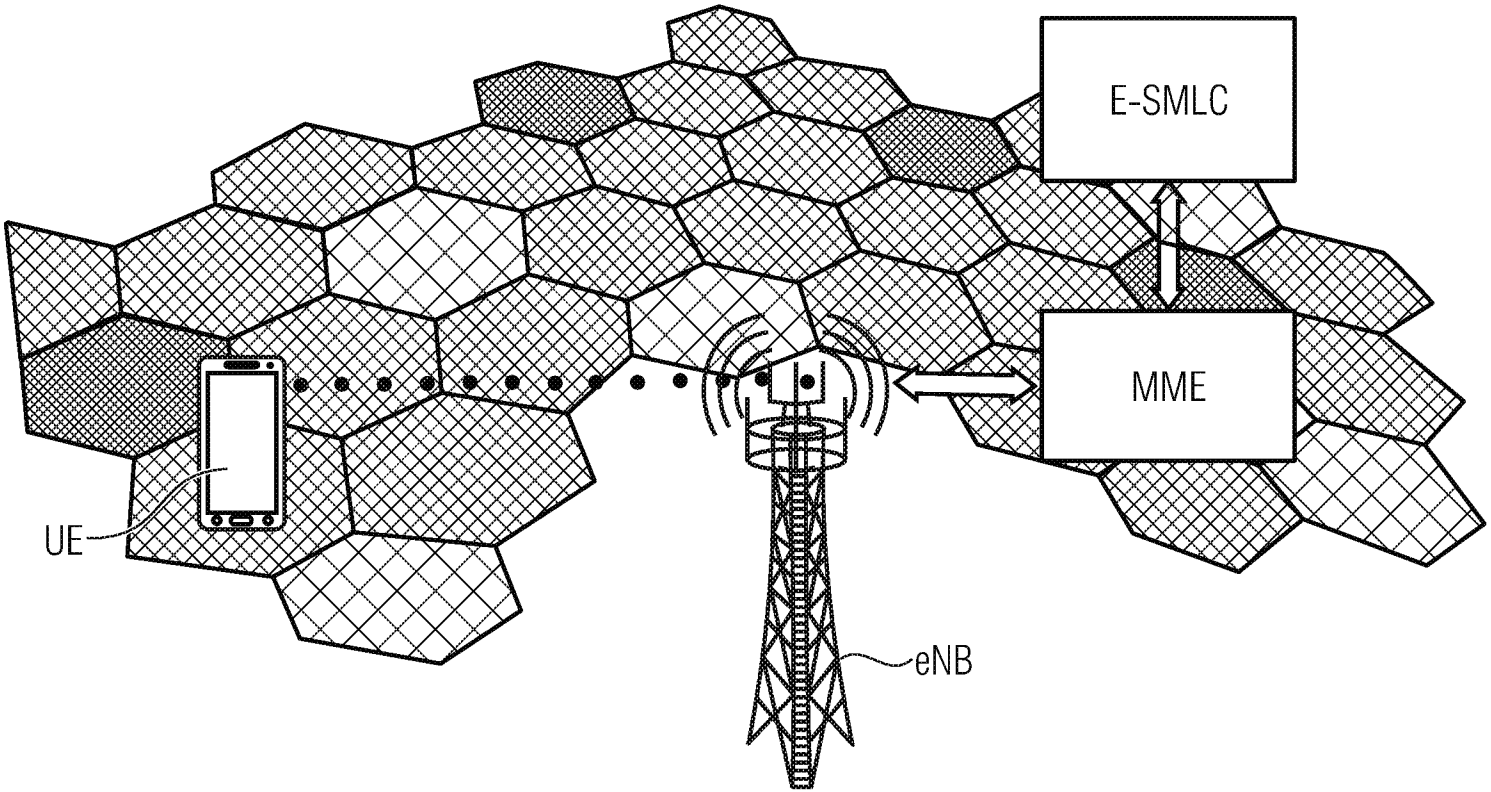
FIG. 10 shows a schematic diagram of a Control Plane Positioning concept.

The base station is configured to await and/or receive a response signal 126 from the user equipment, wherein the UE may transmit the response signal to the base station and/or to a different network node such as a location server. As will be described in more detail in connection with FIG. 10, positioning may be performed on a Control Plane, i.e., the response signal is received by the base station, and/or on a User Plane. Hereinafter and according to embodiments, the base station is configured to receive and/or evaluate the response signal. One aspect of embodiments described herein is the use of beamforming for transmission of the positioning signals. This aspect is independent from a node that receives and/or evaluates the respective response signal. Thus, without limitation, the UE may transmit the response signal to a different node such as a location server.

The response signal 126 may comprise information indicating a parameter of reception of the positioning signal 124 at the user equipment. The parameter may be, for example, a signal to noise ratio (SNR), a signal to interference plus noise ratio (SINR) for one or more paths through which the positioning signal 124 was received, to a time of arrival (ToA) of the positioning signal 124, to a time difference of arrival (TDoA) and/or to a direction of arrival (DoA) of the positioning signal 124. As will be described later in more detail, a plurality of base stations may transmit positioning signals that arrive at the user equipment at different times. The user equipment may determine an observed time difference of arrival (OTDoA) between the arrivals of the different positioning signals and may indicate these time differences or other parameters by transmitting the response signal 126. Thus, the base station may be configured to determine a direction of arrival based on a signal received from the user equipment and wherein the base station may be configured to determine the coarse position information based on the direction of arrival.

The base station may be configured to extract information 128 indicating the parameter or being the parameter of reception and to provide the parameter of reception to a calculator 132. The calculator 132 may be configured to determine the fine position 125 of the user equipment using the parameter of reception. The fine position 125 may more accurate when compared to the coarse position 123. Accuracy of the respective position information may relate to a spatial tolerance range around a real or actual position of the user equipment and/or may relate to an age of the position information. The fine position information may be more accurate by at least 5%, by at least 10% or by at least 20% when compared to the coarse position information 123. For example, an opening angle of a possible direction of the user equipment relative to the eNB, a distance of the UE relative to the eNB, a dimension of a tolerance range around a position of the UE, the tolerance range being affected by the element of uncertainty, an extension of a sector within the cell 100 or the like may be assumed with a first value for the coarse position information and may be determined more precisely when obtaining the fine position information. The fine position information may comprise a coordinate and/or a direction towards the user equipment and/or user equipment position itself. There may exist scenarios in which the UE may receive a PRS sequence with a low channel loss so as to have a sufficiently high SNR even when transmitting the positioning signal unbeamformed or omnidirectionally. An example scenario may be a free-field scenario with a low distance between the eNB and the UE. This may result in a constant SNR and/or in a low or even none improve of accuracy when directing the positioning signal. In such a case the fine position information may have a same accuracy as the coarse positon information but at a sufficiently high level.

The controller 132 may be arranged at, in or close to the eNB, i.e., it may be part of the eNB. Alternatively, the controller 132 may be part of a different network node such as a localization server providing localization data of a network node within the wireless communications network.

The base station eNB may be configured to receive a control information from the user equipment UE, for example a respective signal. The base station may be configured to direct the transmission of the positioning signal towards the user equipment responsive to the control information so as to implement a first transmission pattern. The base station eNB may be configured to transmit the positioning signal 124 according to a different transmission pattern in absence of the control information. Thus, the base station eNB may be triggered so as to implement the directing of the positioning signal 124 responsive to the control information. The control information may be received from the user equipment, from a further base station and/or from a different entity of the network, for example the location server. The different pattern may be, for example, an omnidirectional pattern. This may be understood as an option to direct the positioning signal temporarily, e.g., in case of an emergency or other scenarios requesting for prioritization.

The response signal 126 transmitted by the UE may be transparent for the receiving node such as the location server or the base station, i.e., a signal structure may be unchanged when compared to other response signals. A difference may be found at the UE receiving the positioning signal that receives the positioning signal and/or receives the positioning signal with a better quality when compared to scenarios in which it would miss reception or would receive the positioning signal with low quality.

In other words, in order to increase the receive SNR of the PRS sequence at a specific UE, application of a beam forming vector at the base station is described to transmit the PRS. This may be realized either using analog and/or digital beam forming. Informed PRS signals may be received at the UE and it performs for the plurality of the LoS/NLoS paths from the serving base station and surrounding eNBs time of arrival (ToA), time difference of arrival (TDoA) measurements and direction-of-arrival (DoA) estimations, wherein DoA measurements may be implemented for a multiple antenna UE. The beam forming vector calculation may be based on the estimated channel response associated with the UEs and may be applicable for the serving base station. A beam forming vector calculation may be based on the direction towards the user equipment or the user equipment position. For example, previously obtained location information may be utilized. The beam forming vectors may be applicable at the serving and/other surrounding base stations. Based on the quality or the loss along a path of the multitude of Los/NLoS-paths, the base station may be configured to determine or estimate a direction of a LoS path between the UE and the base station and may form the beam so as to comprise the LoS path. For example, a direction that delivers the highest signal amplitude from the UE may be considered as the LoS path. Additionally, the base station may be configured to form the beam as narrow so as to exclude some, most or all NLoS paths. This may allow for a high transmission quality. Thus, the base station may be configured to determine a Line of Sight path between the user equipment and the base station. The base station may be configured to transmit the positioning signal along the direction of the Line of Sight path whilst excluding a direction of a Non-Line of Sight path.

Figure 4:
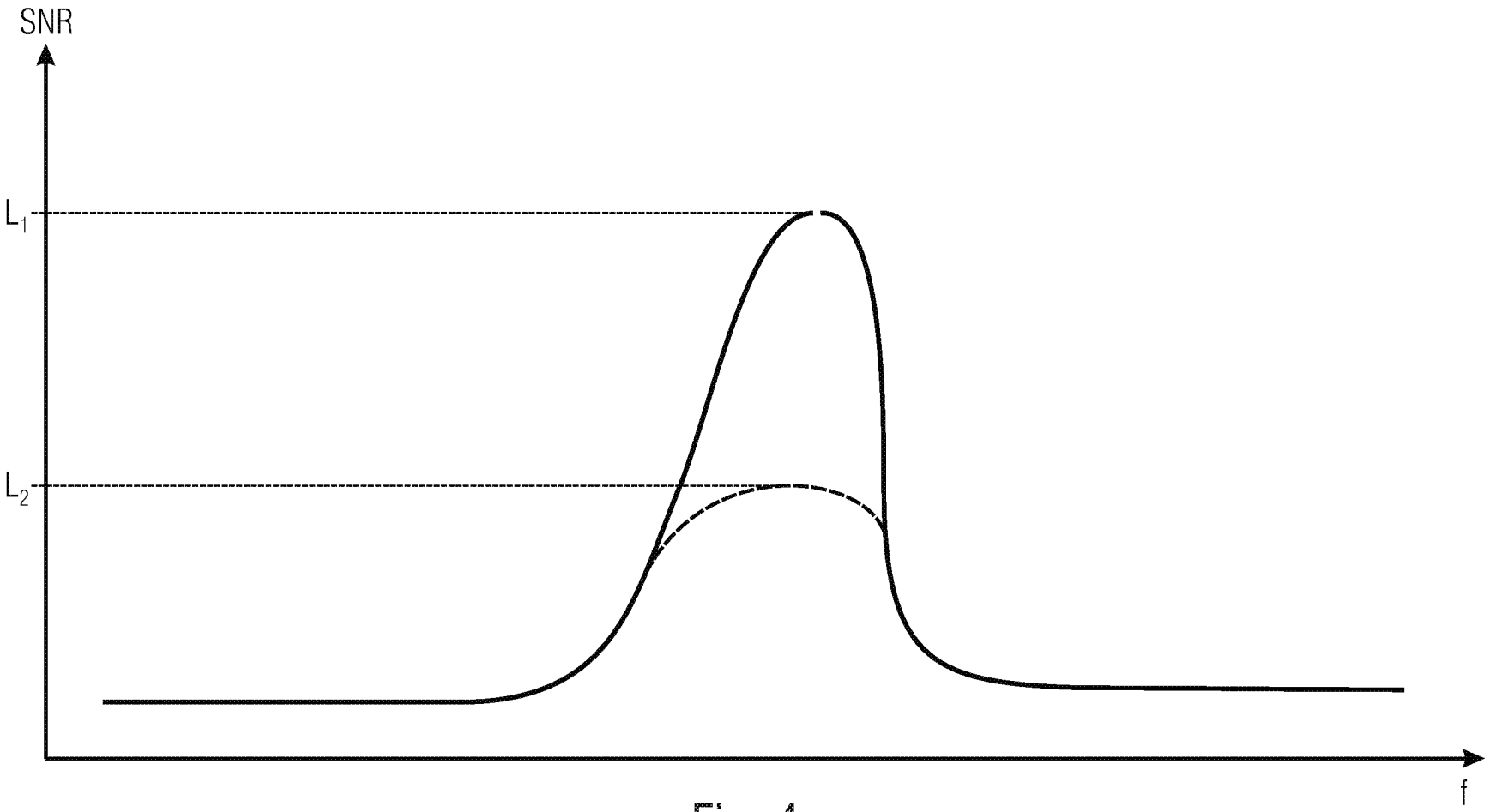
FIG. 4 shows a schematic diagram of a signal to noise ratio obtained by embodiments.

FIG. 4 shows a schematic diagram of a signal to noise ratio SNR shown at the ordinate versus a frequency f shown at the abscissa. For example, the positioning signal 124 may comprise a predetermined sequence such as a PRS sequence, out of a pool of sequences. The user equipment may, by non-limiting example only, execute a correlation, such as a cross-correlation, between the received positioning signal 124 and possible or awaited sequences. Such a correlation may result in one or more peaks, wherein FIG. 4 schematically illustrates a single peak. Reception of the sequence through different paths may result in a higher number of peaks.

Directing the positioning signal 124 into the direction of the user equipment may allow for a higher signal power at the UE when compared to an omnidirectional transmission. This may result in an SNR comprising a level $L_1$ being higher when compared to a level $L_2$ being obtained when transmitting the positioning signal 124 to a larger area, e.g., unbeamformed such as omnidirectionally or determined by the direction or characteristic of a sector antenna, whilst maintaining a transmission power. Thus, by directing the positioning signal, a higher signal power may be obtained at the user equipment allowing for a better signal at the user equipment that comprises a higher SNR or SINR. This better signal may allow for a more precise determination of the transmission characteristic from the base station to the user equipment and/or may allow for a signal quality or signal power level that enables proper determination of the transmission parameter. This may be the case in a scenario were the user equipment is hidden or faces a long distance and would not even recognize the positioning signal being transmitted unbeamformed or at most with a low SNR or SINR.

In other words, embodiments described herein may improve the position estimation for a specific user equipment in the mobile communications network such as an LTE system, based on downlink observed time difference of arrival (OTDoA) measurements. The downlink OTDoA measurement is based on PRS sequences transmitted by the eNBs and received by the UE. The received SNR of the PRS sequence is increased using UE specific beam formed PRS sequences. Moreover, the so-called effective beam formed channel may exhibit less specular (line of sight/non-line of sight; LOS/NLOS) path components compared to the non-beam formed multipath channel. As a consequence, the PRS cross-correlation function exhibits only a single peak or, if resolvable, few multiple peaks, which greatly simplifies ToA/TDoA estimation at the UE.

Figure 5:
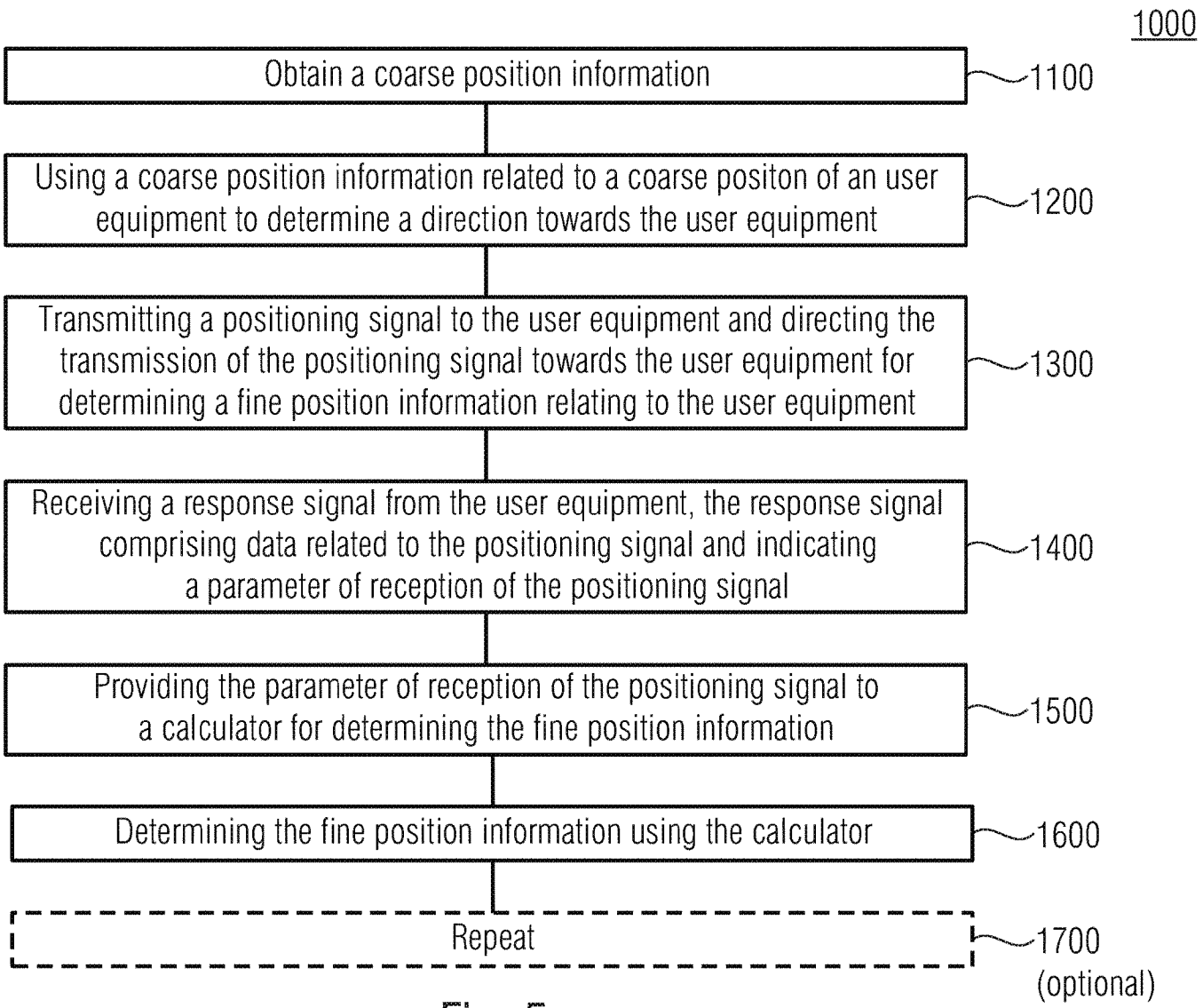
FIG. 5 shows a schematic flow diagram of a method for operating a base station according to an embodiment.

FIG. 5 shows a schematic flow diagram of a method 1000 for operating a base station controlling a wireless communications network cell of a wireless communications network according to an embodiment.

The method comprises a step 1100 in which a coarse position information related to a coarse position of a user equipment is obtained, that may indicate the coarse position 123.

In a step 1200 the coarse position information is used to determine a direction towards the user equipment. The direction may be an absolute value or may be a relative value or a vector from the base station. The direction may be a value or parameter that indicates a direction along which the positioning signal is transmitted with a higher signal power when compared to other directions. For example, the base station may receive a vector or direction from the localization server or a different base station. The vector may indicate a direction from the base station to the coarse position of the UE. The base station may then determine the direction by determining transmission characteristics of its antennas so as to direct the positioning signal along the received vector.

In other words, the serving base station calculates a beam forming vector to be used for the PRS signal before transmission and based on the position or angular information (direction of arrival) from the previous step 1100. The target of the beam forming vector design may be to maximize the receive SNR of the PRS signal at the target UE. A second target may be the minimization of interference to other UEs in the same cell or nearby cells. The beam forming vector calculation may be based on the antenna geometry and antenna response of the eNB, associated with the direction towards the UE or position thereof. Additionally, the beam forming weights may be based on the channel, the direction or the position of other UEs and/or of other base stations.

In a step 1300, a positioning signal, such as the positioning signal 124, is transmitted to the user equipment. The transmission of the positioning signal is directed towards the user equipment, i.e., along the direction towards the user equipment, for determining a fine position information relating to the user equipment based on reception of a response signal responsive to the positioning signal.

In a step 1400, the response signal is received from the user equipment. The response signal comprises data related to the positioning signal and indicating a parameter of reception of the positioning signal.

In a step 1500, the parameter of reception is provided to a calculator so as to allow for determining the fine position information, for example, to the calculator 132.

In a step 1600, the fine position information is determined using the calculator. The calculator may be, for example, a central processing unit (CPU), a microcontroller, an application specific integrated circuit (ASIC) or any other device being programmable by hardware or software so as to execute steps for determining the fine position information.

An optional step 1700 may comprise repetition of method 1000, i.e., of one or more steps 1100, 1200, 1300, 1400, 1500 and/or 1600. For example, the determined fine position information determined in step 1600 may be used as coarse position information during a repetition of method 1000.

Figure 6A:
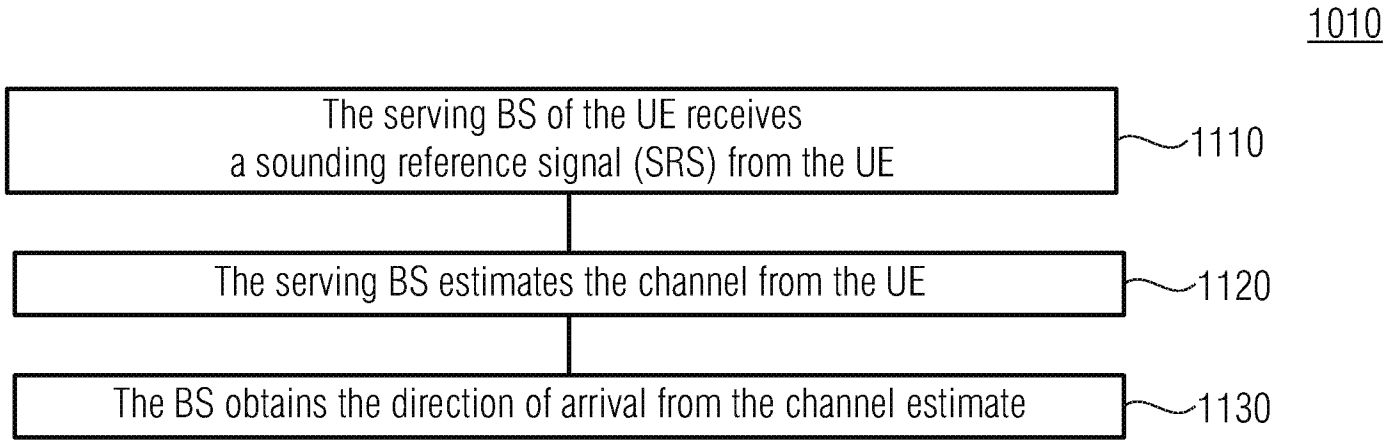
FIG. 6a shows a schematic flow chart of a method that may be executed so as to obtain a coarse position information for the method of FIG. 5, according to an embodiment.

FIG. 6a shows a schematic flow chart of a method 1010 that may be executed so as to obtain the coarse position information in step 1100. In a step 1110, the serving base station of the user equipment may receive a so-called sounding reference signal (SRS) from the user equipment. Alternatively, the base station may receive any other suitable signal that may allow for channel estimation at the base station.

In a step 1120, the serving base station may estimate the channel and/or the channels from the user equipment using the received SRS. This may include line of sight paths and/or non-line of sight paths.

In a step 1130, the base station may obtain the direction of arrival from the channel estimate. The base station may be configured to use the direction of arrival as the coarse position information, i.e., the base station may be configured to use the coarse position information as the direction determined in step 1200.

Figure 6B:
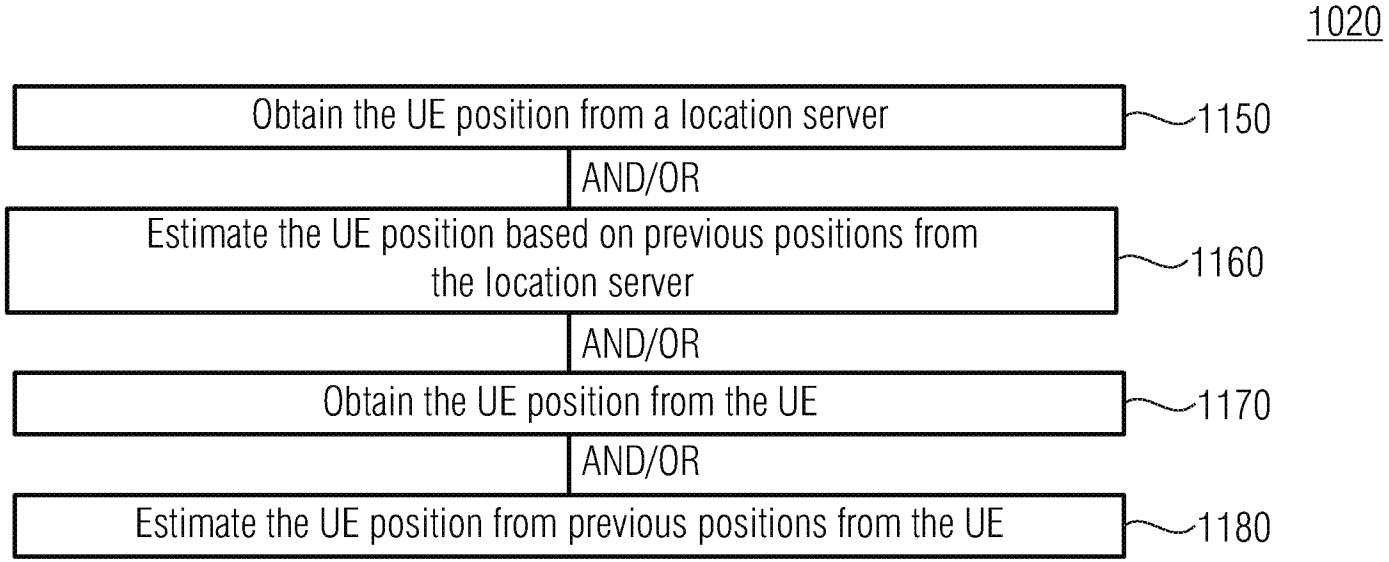
FIG. 6b shows a schematic diagram of a further method that may be used alternatively or in addition to the method of FIG. 6a, according to an embodiment.

FIG. 6b illustrates a schematic diagram of a method 1020 that may be used alternatively or in addition to the method 1010 so as to obtain the coarse position information. In a step 1150, the base station may obtain the position of the user equipment from a location server. A location server that is available in the network may be a suitable source of information. Alternatively or in addition, the base station may estimate the user equipment based on previous positions stored in the location server and provided in a step 1160. For example, an aged and, therefore, possibly inaccurate but nevertheless useable position information may be obtained from the location server.

Alternatively or in addition, the position of the user equipment may be obtained from the user equipment in a step 1170. For example, the user equipment may transmit its position as far as it has knowledge about its position. For example, the user equipment may comprise a positioning device that is configured to provide information about the coarse position. For example, the user equipment may determine its position based on a global navigation satellite system. Alternatively or in addition, the user equipment may be configured to transmit its position based on a user command indicating the own position.

Alternatively or in addition, the base station may be configured to estimate the user equipment position from a position being obtained previously from the user equipment in a step 1180, for example, the base station may be configured to use an aged information that was previously received from the user equipment, for example during the step 1170.

Any other method may be implemented so as to obtain the coarse position information indicating a coarse position of the user equipment.

Figure 7:
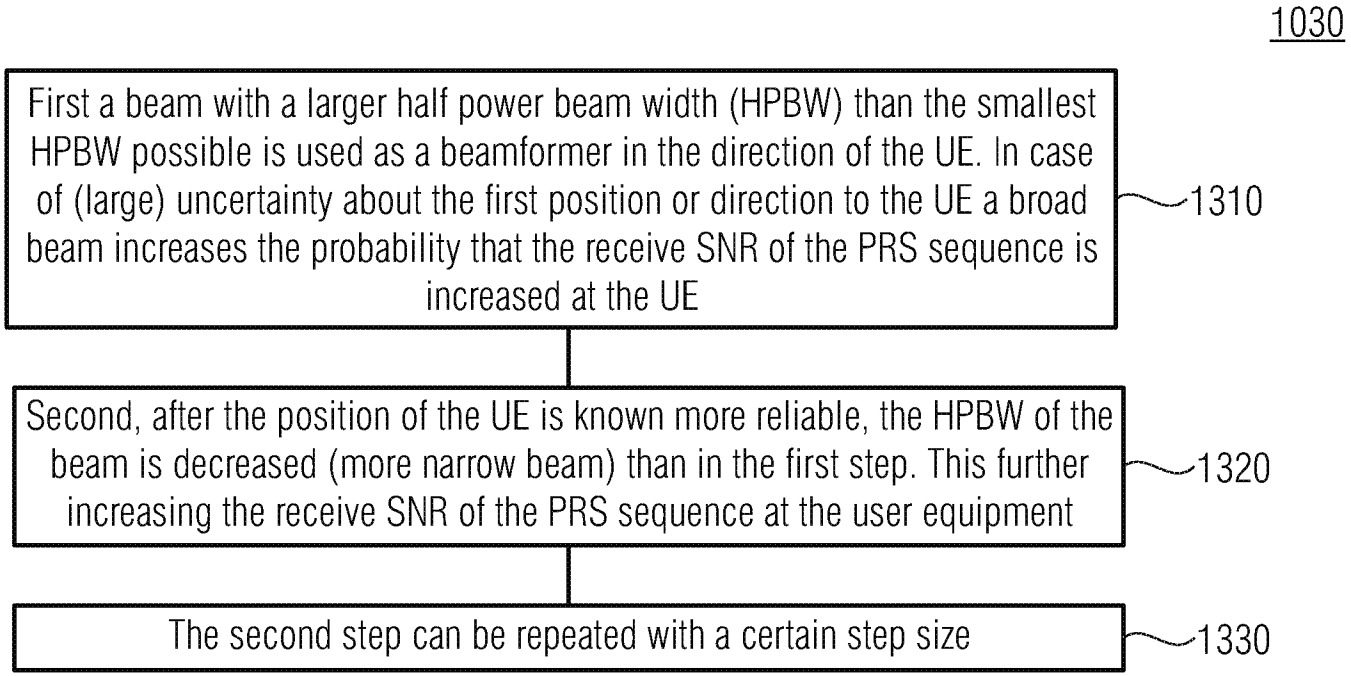
FIG. 7 shows a schematic diagram of a method according to an embodiment for increasing a robustness.

In case many antennas are available at the base station, the robustness of the approach may be increased by applying one or more of the following steps of a method 1030 described in connection with FIG. 7. Method 1030 may be implemented as part of the step 1300. In a step 1310, a beam with a larger half power beam width (HPBW) than the smallest possible HPBW is used as a beam former in the direction of the user equipment. The size of the HPBW may be based on an uncertainty about the coarse position information. For example the older the information is or the faster the user equipment moves, the larger the HPBW may be. A broad beam may increase the probability that the received SNR of the PRS sequence is increased at the user equipment. This may allow for using first a broad beam allowing for a robust reception by the UE and then a successively narrower beam allowing for increased SNR whilst maintaining secure reception by the UE.

In a step 1320 that may be executed, for example during a repetition of the method 1000 and/or when the position of the user equipment is known more reliable, i.e., when the fine position information is obtained, the HPBW of the beam may be decreased so as to obtain a more narrow beam when compared to the step 1310. This may allow for a further increase of the received SNR of the PRS sequence at the user equipment, in particular when the power of transmission is kept unchanged or at least almost unchanged, i.e., the same or almost same transmission power is focused in a more narrow beam.

In a step 1330, the step 1320 may be repeated with a certain step size. For example, the HPBW may be decreased by a value being between 0.5 and 10, between 1 and 6 or between 2 and 4 such as 3 dB in each step until the smallest possible HPBW, being a hardware-specific parameter, is achieved. The smallest possible HPBW may be based or may depend on a number of antennas and/or on an array aperture. Thus, the base station may be configured to repeat determining of the position of the user equipment in subsequent steps. The base station may be configured to use the fine position information of the user equipment determined in a first step as coarse position information in a second step following the first step. The base station may be configured to direct the positioning signal using a beam forming technique. The base station may be configured to reduce a width of a second beam used in the second step when compared to a width of a first beam used in the first step.

Figure 8:
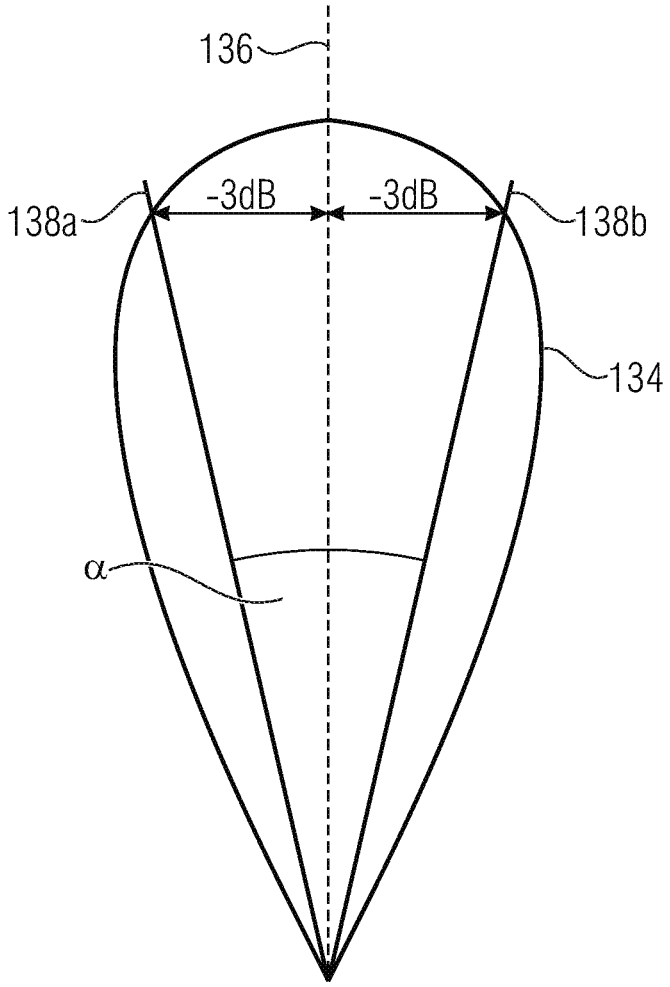
FIG. 8 shows a schematic top view of a beam that may be transmitted by a base station, according to an embodiment.

FIG. 8 shows a schematic top view of a beam or lobe 134 that may be transmitted by a base station such as the eNB illustrated in FIG. 3. Along a direction 136 a maximum power of the beam 134 may be transmitted. Borders 138a and 138b may indicate a region of a half-power, i.e., −3 dB that corresponds to 50%, of the maximum power. An angle $\alpha$ between the borders 138a and 138b may indicate the HPBW. The HPBW may be the angle $\alpha$ between the half-power points of the beam 134, when referenced to the peak effective radiated power of the beam 134. A beam width may be expressed by a non-limiting example in degrees and/or in a horizontal plane but may also relate to an azimuth or the like.

Although the description provided herein relates to one direction along which the positioning signal is transmitted, embodiments provide a base station that is configured for directing the transmission of the positioning signal towards the user equipment along at least a first and a second path, i.e., along a first and a second direction. The base station may be configured to obtain information related to at least a first direction of arrival of a first path and a second direction of arrival of a second path between the base station and the user equipment and to transmit the positioning signal along the first direction and along the second direction. When referring again to FIG. 3, the positioning signal 124 may be transmitted using at least a first and a second beam, each beam associated to a path between the base station eNB and the user equipment UE.

In other words, in case the Direction of Arrival (DoA) of multiple paths is known, for example, a line of sight and strong non-line of sight paths, multiple beams may be designed in the direction of the multiple detected strong paths. A strong path may be a path that comprises a channel quality above a certain power threshold and/or comprises a path loss that is below a certain path loss threshold. Alternatively, other threshold values may be used. The paths may be determined by non-limiting example during a channel estimation such as responsive to the SRS signal as described in connection with method 1010. This may allow for a multi hypothesis Reference Signal Time Difference (RSTD) measurement at the user equipment, which can also improve the positioning accuracy. Multi hypothesis RSTD measurement may be understood in that, in addition to the largest peak of the correlated receive PRS sequence that is reported, also other peaks are reported from the user equipment to the base station. Multi hypothesis RSTD measurement is described, for example, in [4]. The reports on multiple peaks may be information related to different paths of arrival. The base station may be configured to determine a location of the paths based thereon. Alternatively, the user equipment may provide the information on its own, for example when using the position of the base station.

Figure 9:
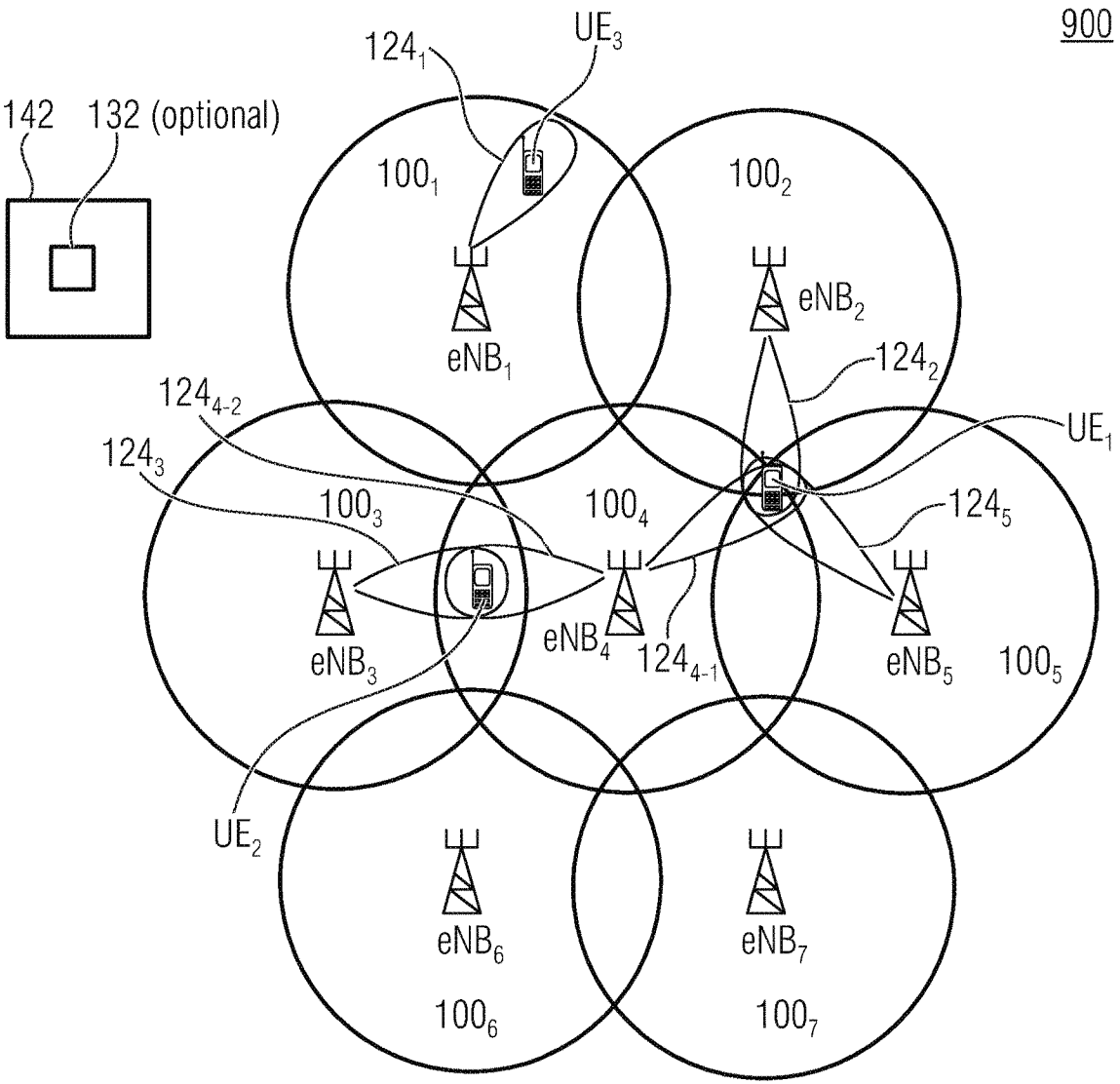
FIG. 9 shows a schematic block diagram of a wireless communications network according to an embodiment.

FIG. 9 shows a schematic block diagram of a wireless communications network 900 that may be based on the wireless communications network illustrated in FIG. 1 and/or may be an extended version thereof. The wireless communications network 900 may comprise at least a first and a second, and probably more, base stations $eNB_1$ to $eNB_7$, wherein each base station is configured to operate a wireless communications network cell $\mathbf{100}_1$ to $\mathbf{100}_7$. A user equipment $UE_1$ may be arranged in a transition zone between more than one base stations, for example, three base stations $eNB_2$, $eNB_4$ and $eNB_5$. In the transition zone, one of the plurality of base stations may operate or serve the user equipment $UE_1$ but other base stations are capable to transmit signals to the $UE_1$. According to embodiments, most of the cells are surrounded by other cells or base stations, wherein adjacent base stations are capable to reach large areas of the cell such that at essentially each position or at each position of a cell a positioning signal may be received from at least three different base stations. Alternatively, the user equipment $UE_1$ may be arranged outside the transition zone, e.g., when using a method for determining the transmission parameters that may be performed with a signal that is received from a single or at most two base stations.

In addition to the serving base station $eNB_4$ of the user equipment $UE_1$, at least one, advantageously at least two further base station $eNB_2$ and/or $eNB_5$ may be within range so as to transmit a respective positioning signal in the direction of the user equipment $UE_1$, i.e., positioning signals $\mathbf{124}_2$, $\mathbf{124}_{4\text{-}1}$ and $\mathbf{124}_5$ may arrive at different times at the user equipment $UE_1$. Although arriving at different times, the times of reception of the positioning signals $\mathbf{124}_2$, $\mathbf{124}_{4\text{-}1}$ and $\mathbf{124}_5$ may partly overlap. This may allow for determining a TDoA, in particular a down link observed TDoA at the user equipment $UE_1$. However, the user equipment $UE_1$ may determine the parameter of reception for each of the positioning signals $\mathbf{124}_2$, $\mathbf{124}_{4\text{-}1}$ and $\mathbf{124}_5$ and may report the parameter of reception to the serving base station such as $eNB_4$. Each of the positioning signals $\mathbf{124}_2$, $\mathbf{124}_{4\text{-}1}$ and $\mathbf{124}_5$ may comprise a different sequence out of a pool of sequences. For example, the pool may comprise 4, 5 or 6 or a different number of sequences being different from each other. Each of the base stations may be configured to use a different sequence so as to allow for a distinguishing element at the $UE_1$. The $UE_1$ may thus assign the positioning signals $\mathbf{124}_2$, $\mathbf{124}_{4\text{-}1}$ and $\mathbf{124}_5$ to a specific base station $eNB_2$, $eNB_4$ and $eNB_5$ respectively and may determine a difference in the times of arrival and may inform the serving base station about those values, i.e., it may transmit the parameter of reception using the signal 126.

The serving base station $eNB_4$ may be configured to inform other base stations in the wireless communications network 900 about the coarse position information relating to the user equipment $UE_1$. For example, the base station $eNB_4$ may communicate directly with the other base stations $eNB_2$ and/or $eNB_5$. Alternatively or in addition, a location server 142 that may optionally comprise the controller 132 may be configured to communicate with the base stations $eNB_1$ to $eNB_7$. The base station $eNB_4$ may inform the location server 142 about the coarse position of the user equipment $UE_1$. $eNB_2$ and/or $eNB_5$ may receive the information relating to the coarse position from the location server 142, i.e., each of the base stations $eNB_2$, $eNB_4$ and $eNB_5$ and probably other base stations may have knowledge about the coarse position information. The base stations $eNB_2$, $eNB_4$ and $eNB_5$ may direct the positioning signal in the direction of the user equipment $UE_1$, i.e., the base stations $eNB_2$, $eNB_4$ and $eNB_5$ may be configured to perform a coordinated beam forming or to coordinately use a beam forming technique for transmitting the positioning signal. Although explained in connection with a number of three base stations, a coordinately usage of beam forming may be realized by a number of two, a number of three, a number of four or more base stations transmitting a positioning signal in the direction towards the user equipment $UE_1$.

A second user equipment $UE_2$ may be operated or served in the wireless communications network, for example by $eNB_3$, $eNB_4$. The base stations $eNB_3$ and $eNB_4$ may be configured to transmit positioning signals $\mathbf{124}_3$ and $\mathbf{124}_{4\text{-}2}$ in a direction towards the user equipment $UE_2$ of the wireless communications network 900. The positioning signals $\mathbf{124}_3$ and $\mathbf{124}_{4\text{-}2}$ may comprise a sequence that is different from each other. The base station $eNB_4$ may be configured to use the same sequence when transmitting the positioning signals $\mathbf{124}_{4\text{-}1}$ and $\mathbf{124}_{4\text{-}2}$. Thus, the base station $eNB_4$ may be configured to transmit the positioning signal $\mathbf{124}_{4\text{-}2}$ so as to comprise a same sequence of the plurality of sequences into the direction of the user equipment $UE_2$. This may allow for generating the positioning signals $\mathbf{124}_{4\text{-}1}$ and $\mathbf{124}_{4\text{-}2}$ as same or comparable signals and/or to transit a same signal along a direction towards $UE_1$ and along a direction towards $UE_2$. Along other directions such as outside the beams, a signal power of at most 50%, of at most 40% or at most 30% may be generated by the base station. For example, a low-power side lobe of transmission of the positioning signal $\mathbf{124}_{4\text{-}1}$ may hit a different UE, but at least a high-power side lobe or every high-power side lobes are formed so as to exclude the direction towards $UE_2$. This may allow for a low intra-cell interference.

Alternatively to a use of different sequences, at least one of the plurality of eNBs may be configured to use an equal sequences such that the $UE_1$ or $UE_2$ receives the same sequence from different base stations. This may be done by a separation in time, i.e., the sequence may be received from a first base station such as $eNB_4$ at a first instance of time or slot and from a second base station such as $eNB_2$ or $eNB_5$ in a second slot. Alternatively or in addition, such a separation in time, i.e., usage of different slots, may also be used for transmission of different sequences. This may also allow for a further increase of SNR and/or SINR at the UE. This may be understood as the base station $eNB_4$ being optionally configured to transmit the positioning signal $\mathbf{134}_{4\text{-}2}$ in a direction of the user equipment $UE_2$ whilst not transmitting a different positioning signal into a direction towards the user equipment $UE_1$.

In other words, when referring to the $UE_1$ and/or $UE_2$, the beam formed PRS signals may be received by the respective UE and it performs for the plurality of LoS paths from the serving base station and probably surrounding base stations a time of arrival (ToA) and/or time difference of arrival (TDoA) measurements. If the user equipment is equipped with multiple antennas, the UE may also estimate the direction-of-arrival (DoA) in terms of azimuths and/or elevation angles of the path components of the effective beam formed channel that will suffer with high probability from fewer multipath components than the unbeamformed signaling. Based on the measurements, so-called RSTD values (reference signal time difference) and optionally corresponding DoA values may be obtained for the dominant or optional multiple strong propagation paths. The ToA, TDoA that is called RSTD in LTE and/or DoA estimates may be transmitted to the serving base station or the location server. The location server may apply a 3D channel mode description where each path may be described by a set ToA/TDoA and probably DoA angles to calculate the direction towards the UE or directly the UE position.

In still other words, the serving base station may distribute the direction towards the user equipment or the UE position information to the surrounding base stations, for example directly or via the location server. A position with higher accuracy may then be calculated at the location server. As an optional possibility, a refinement of beam forming vectors may be done based on the enhanced estimation position from the procedure that was previously described. The more accurate the position is known, the better the beam former may be designed, the higher the receive SNR of the PRS may be at the UE which, in return, allows for a more accurate determination of the position. A further optional step may define that other base stations may also obtain the position of the users, for example from the location server or the UE and/or it is distributed by the serving base station or estimated on SRS received from the UE. In case different PRS sequences, e.g., from all involved base stations, are received by the UE, all base stations can apply beam formed PRS towards the target UE to increase the received SNR of each of the PRS sequences. Currently, a reuse of 6 is available, as described in [3]. Due to the design of PRS sequences, which are not orthogonal to each other, coordinated beam forming may be used to further increase the SINR of the PRS sequences received at the UE. For example, in time slot 1, base station 1 may transmit beam formed PRS sequences to increase the SNR while other base stations use beam formed PRS sequences to decrease the SNR of their signal at the UE or, in other words, a null should be beam formed in the direction of the UE. When referring again to FIG. 9, the base station $eNB_1$ may serve user equipment $UE_3$ and may be configured to transmit a positioning signal $\mathbf{124}_1$ in the direction of user equipment $UE_3$ whilst excluding a transmission to other user equipment such as $UE_1$ and/or $UE_2$. In the next time slot this is shifted to the next base station. In case the same PRS sequences are used by some of the base stations, coordinated beam forming along the base station can be done similar to the previous description. For example, base station 1 may transmit a beam formed PRS sequence to increase the SNR while other base stations may use the same sequence and may use beam formed PRS sequences to decrease the SNR of their signal at the UE or, in other words, a null should be beam formed in the direction of the user equipment.

The updated, e.g., more precise, direction towards the user equipment or the UE position information may be distributed among the surrounding base stations, based on the beam formed PRS sequences used in the previous step.

Embodiments described herein may relate to a receive SNR of the PRS sequences of the user equipment and may allow for a localization accuracy that is improved. For other user equipment the SNR may decrease, for example when a location of the other user equipment is not considered during the beam forming. Therefore, it may be used, for example, for emergency calls. In case of emergency calls, the position has to be obtained by the network cell, as described in [5]. The described methods and/or base stations may be used to increase the positioning accuracy for emergency calls, for example. The embodiments may additionally or as an alternative help to increase the reuse of time, frequency and code resources.

Although some embodiments are described in a way that the base station is configured to receive the response signal such as the response signal 126, alternatively or in addition, a different node of the network may be configured to receive the response signal, for example, a location server such as the location server 142. The embodiment described in connection with FIG. 3 may be referred to as a Control Plane Positioning that is illustrated in connection with FIG. 10. With Control Plane implementations, most commonly used in emergency services, positioning messages are exchanged between the network and the UE over the signaling connection. In LTE, control plane positioning is enabled by the Mobility Management Entity (MME), which routes LPP messages from the E-SMLC (Serving Mobile Location Center) to the UE using NAS (Non-Access Stratum) Downlink Transfer Messages which is applicable to the scenario of FIG. 10. Control Plane positioning is quick, reliable and secure.

The response 126 or a similar message transmitted from the UE to the location server in addition or alternatively to a transmission to the base station may be referred to as an user plane positioning. In such a case some or all of the calculations may be performed by the calculation server.

Thus, the base station may be configured to adapt the positioning signal so as to allow for a determination of the fine position information based on data related to the positioning signal. Such data may comprise a parameter of reception, i.e., data indicating the reception of the response signal at the UE. The data and/or parameter may be at least a part of a response signal that is transmitted from the UE to the base station and/or to a different node such as the location server. The determination of the fine position information may be obtained by a calculator that may be arranged or located at or in the base station or the different node. For Control Plane Positioning, the base station may be configured to receive the response signal from the user equipment, wherein the response signal may comprise data related to the positioning signal and may indicate the parameter of reception of the positioning signal. The base station may be configured to provide the parameter of reception of the sequence to a calculator for determining the fine position information.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] 3GPP, "LTE Positioning Protocol (LPP) (Release 13)", 3rd Generation Partnership Project, March 2016 Second reference.

[2] 3GPP, "LTE Positioning Protocol A (LPPa) (Release 13)", 3rd Generation Partnership Project, March 2016.

[3] [3GPP15-37857] 3GPP, "Study on indoor positioning enhancements for UTRA and LTE", 3rd Generation Partnership Project, December 2015.

[4] EENA, "EENA Position Paper on the provision of mobile caller-location information in the context of calls to the European emergency number 112", European Emergency Number Association, December 2010.

[5] 3GPP, "Study on indoor positioning enhancements for UTRA and LTE", 3rd Generation Partnership Project, December 2015.

[6] 3GPP, "Physical Channels and Modulation", 3rd Generation Partnership Project, vol. V13.0.0, January. 2016

The invention claimed is:

1. A base station configured to control a wireless communications network cell of a wireless communications network, *the base station comprising:*

*a wireless interface for transmitting and/or receiving wireless signals*;

wherein the base station is configured to use a coarse position information related to a coarse position of [an] *a* user equipment to determine a direction towards the user equipment;

wherein the base station is configured to transmit a positioning signal to the user equipment and to direct the transmission of the positioning signal towards the user equipment;

wherein the positioning signal is adapted to allow for a determining of a fine position information relating to the user equipment; and wherein the base station is configured to receive a response signal from the user equipment, the response signal comprising data related to the positioning signal and indicating a parameter of reception of the positioning signal, and determine the fine position information using the parameter of reception, wherein the base station is configured to repeat determining of [the] *a* position of the user equipment in subsequent steps, wherein the base station is configured to use the fine position information of the user equipment determined in a first step as *the* coarse position information in a second step following the first step; and wherein the base station is configured to direct the positioning signal using a beamforming technique, and wherein the base station is configured to reduce a width of a second beam used in the second step when compared to a width of a first beam used in the first step; or wherein the fine position information is more accurate when compared to the coarse position information by at least 5%.

2. The base station according to claim 1, wherein the positioning signal is adapted to allow for a determination of the fine position information based on data related to the positioning signal, the data indicating a parameter of reception of the positioning signal.

3. The base station according to claim 1, wherein the base station is configured to receive [a] *the* response signal from the user equipment, the response signal comprising data related to the positioning signal and indicating a parameter of reception of the positioning signal; and wherein the base station is configured to provide the parameter of reception of the sequence to a calculator for determining the fine position information.

4. The base station according to claim 3, wherein the base station comprises the [controller] *calculator*.

5. The base station according to claim 2, wherein the parameter of reception is related to at least one of a time of arrival, a time difference of arrival and a direction of arrival.

[6. The base station according to claim 1, wherein the base station is configured to direct the transmission of the positioning signal using a beamforming technique.]

7. The base station according to claim 1, wherein the base station is configured to transmit the positioning signal in a shared channel of the wireless communications network cell.

8. The base station according to claim 1, wherein the base station is configured to determine a direction of arrival based on a signal received from the user equipment and wherein the base station is configured to determine the coarse position information *of the first step* based the direction of arrival.

9. The base station according to claim 1, wherein the base station is configured to receive the coarse position information *of the first step* from a location server of the wireless communications network or from a further base station.

10. The base station according to claim 1, wherein the base station is configured to receive a signal from the user equipment comprising a position information, wherein the base station is configured to use the received position information as the coarse position information *of the first step*.

11. The base station according to claim 1, wherein the user equipment is a first user equipment and wherein the base station is configured to exclude a direction towards a second user equipment or towards a further base station from the direction of the positioning signal.

12. The base station according to claim 1, wherein, to direct the transmission of the positioning signal towards the user equipment, the base station is configured to obtain information related to at least a first direction of arrival of a first path and a second direction of arrival of a second path between the base station and the user equipment and to transmit the positioning signal along the first direction and along the second direction.

13. The base station according to claim 1, wherein the base station is configured to receive a control information from the user equipment and to direct the transmission of the positioning signal towards the user equipment responsive to the control information so as to implement a first transmission pattern, wherein the base station is configured to transmit the positioning signal according to a second transmission pattern in absence of the control information.

14. The base station according to claim 1, wherein the user equipment is associated to a further base station of the wireless communications network, and wherein the base station is configured to receive the coarse position information from a location server of the wireless communications network or from the further base station.

15. The base station according to claim 1, wherein the user equipment is a first user equipment and wherein the positioning signal is a first positioning signal, wherein the base station is configured to transmit the first positioning signal so as to comprise a first sequence of a plurality of predetermined sequences for positioning signals, wherein the base station is configured to transmit a second positioning signal comprising a second sequence of the plurality of sequences in a direction of a second user equipment whilst not transmitting the second positioning signal into a direction of the first user equipment.

16. The base station according to claim 1, wherein the sequence comprises a Positioning Reference Signal or is a Positioning Reference Signal.

17. The base station according to claim 1, wherein the wireless communications network is an LTE network.

18. The base station according to claim 1, wherein the base station is configured to determine a Line of Sight path between the user equipment and the base station, wherein the base station is configured to transmit the positioning signal along the direction of the Line of Sight path whilst excluding a direction of a Non-Line of Sight path.

19. A wireless communications network comprising:

*a user equipment;* a first base station [according to claim 1 and] *configured to control a first wireless communications network cell of the wireless communications network and configured to transmit a first positioning signal to the user equipment and to direct the transmission of the first positioning signal towards the user equipment; wherein the first positioning signal is adapted to allow for a determining of a fine position information relating to the user equipment, the wireless communications network comprising* a second base station [according to claim 1, wherein the first base station is configured to transmit a first positioning signal and wherein the second base station is configured to transmit a second positioning signal] *configured to control a second wireless communications network cell of the wireless communications network; wherein the second base station is configured to use a coarse position information related to a coarse position of the user equipment to determine a direction towards the user equipment; wherein the second base station is configured to transmit a second positioning signal to the user equipment and to direct the transmission of the second positioning signal towards the user equipment; wherein the second positioning signal is adapted to allow for a determining of a fine position information relating to the user equipment;*,

[a user equipment;]

wherein the first base station and second base station are configured to coordinately use a beamforming technique for transmitting the first *positioning signal with the first base station* and *the* second positioning signal *with the second base station*; and wherein the user equipment is a first user equipment, wherein the wireless communications network comprises a second user equipment and wherein the first base station is configured to transmit a third positioning signal so as to comprise [the] *a* first sequence of the plurality of sequences and not [the] *a* second sequence into a direction of the second user equipment; or wherein the first base station is configured to transmit the first positioning signal so as to comprise [a] *the* first sequence of a plurality of predetermined sequences for position signals into a direction of the user equipment, and wherein the second base station is configured to transmit the second positioning signal so as to comprise the first sequence into a direction of the user equipment and wherein the first base station is configured to transmit the first positioning signal to the user equipment during a first time interval and not during a second time interval following the first time interval, wherein the second base station is configured to transmit the second positioning signal to the user equipment during the second time interval and not during the first time interval.

20. The wireless communications network according to claim 19, wherein the first base station is configured to transmit the first positioning signal so as to comprise a first sequence of a plurality of predetermined sequences for position signals into a direction of the user equipment, and wherein the second base station is configured to transmit the second positioning signal so as to comprise the second sequence into a direction of the user equipment.

21. The wireless communications network according to claim 20, wherein the first base station is configured to transmit the first positioning signal to the user equipment during a first time interval and not during a second time interval following the first time interval, wherein the second base station is configured to transmit the second positioning signal to the user equipment during the second time interval and not during the first time interval.

22. A method for operating a base station controlling a wireless communications network cell of a wireless communications network, the method comprising:

using a coarse position information related to a coarse position of an user equipment to determine a direction towards the user equipment;

transmitting a positioning signal to the user equipment, the positioning signal adapted to allow for a determining of a fine position information relating to the user equipment, and directing the transmission of the positioning signal towards the user equipment for determining a fine position information relating to the user equipment;

such that the base station receives a response signal from the user equipment, the response signal comprising data related to the positioning signal and indicating a parameter of reception of the positioning signal, and determining the fine position information using the parameter of reception, such that the base station repeats determining of [the] *a* position of the user equipment in subsequent steps, such that the base station uses the fine position information of the user equipment determined in a first step as *the* coarse position information in a second step following the first step; and such that the base station directs the positioning signal using a beamforming technique, and such that the base station reduces a width of a second beam used in the second step when compared to a width of a first beam used in the first step; or such that the fine position information is more accurate when compared to the coarse position information by at least 5%.

23. A method for operating a wireless communications network comprising:

operating a user equipment in the wireless communications network;

operating a first base station [according to claim 1] *to control a first wireless communications network cell of the wireless communications network; such that the first base station uses a coarse position information related to a coarse position of the user equipment to determine a direction towards the user equipment; such that the first base station transmits a first positioning signal to the user equipment and directs the transmission of the first positioning signal towards the user equipment; such that the first positioning signal is adapted to allow for a determining of a fine position information relating to the user equipment* and operating a second base station [according to claim 1] *to control a second wireless communications network cell of the wireless communications network; such that the second base station uses the coarse position information related to the coarse position of the user equipment to determine a direction towards the user equipment; such that the second base station transmits a second positioning signal to the user equipment and directs the transmission of the second positioning signal towards the user equipment; such that the second positioning signal is adapted to allow for a determining of a fine position information relating to the user equipment the first and second base station operated* so as to coordinately using a beamforming technique for transmitting the first and second positioning signal;

[such that the user equipment is a first user equipment, wherein the wireless communications network comprises a second user equipment and such that the first base station transmits a third positioning signal so as to comprise the first sequence of the plurality of sequences and not the second sequence into a direction of the second user equipment; or]

such that the first base station transmits the first positioning signal so as to comprise a first sequence of a plurality of predetermined sequences for position signals into a direction of the user equipment, and such that the second base station transmits the second positioning signal so as to comprise the first sequence into a direction of the user equipment and such that the first base station transmits the first positioning signal to the user equipment during a first time interval and not during a second time interval following the first time interval, such that the second base station transmits the second positioning signal to the user equipment during the second time interval and not during the first time interval*; or*

*such that the user equipment is a first user equipment, wherein the wireless communications network comprises a second user equipment and such that the first base station transmits a third positioning signal so as to comprise the first sequence of the plurality of sequences and not the second sequence into a direction of the second user equipment.*

24. A non-transitory digital storage medium having a computer program stored thereon to perform the method for operating a base station controlling a wireless communications network cell of a wireless communications network, the method comprising:

using a coarse position information related to a coarse position of [an] *a* user equipment to determine a direction towards the user equipment;

transmitting a positioning signal to the user equipment, the positioning signal adapted to allow for a determining of a fine position information relating to the user equipment, and directing the transmission of the positioning signal towards the user equipment for determining a fine position information relating to the user equipment, such that the base station receives a response signal from the user equipment, the response signal comprising data related to the positioning signal and indicating a parameter of reception of the positioning signal, and determining the fine position information using the parameter of reception, such that the base station repeats determining of [the] *a* position of the user equipment in subsequent steps, such that the base station uses the fine position information of the user equipment determined in a first step as *the* coarse position information in a second step following the first step; and such that the base station directs the positioning signal using a beamforming technique, and such that the base station reduces a width of a second beam used in the second step when compared to a width of a first beam used in the first step; or such that the fine position information is more accurate when compared to the coarse position information by at least 5%, when said computer program is run by a computer.

25. A non-transitory digital storage medium having a computer program stored thereon to perform the method for operating a wireless communications network comprising:

operating a user equipment in the wireless communications network;

[operating a first base station according to claim 1 and operating a second base station according to claim 1 so as to coordinately using a beamforming technique for transmitting the first and second positioning signal] *operating a first base station to control a first wireless communications network cell of the wireless communications network; such that the first base station uses a coarse position information related to a coarse position of the user equipment to determine a direction towards the user equipment; such that the first base station transmits a first positioning signal to the user equipment and directs the transmission of the first positioning signal towards the user equipment; such that the first positioning signal is adapted to allow for a determining of a fine position information relating to the user equipment and operating a second base station to control a second wireless communications network cell of the wireless communications network; such that the second base station uses the coarse position information related to the coarse position of the user equipment to determine a direction towards the user equipment; such that the second base station transmits a second positioning signal to the user equipment and directs the transmission of the second positioning signal towards the user equipment; such that the second positioning signal is adapted to allow for a determining of a fine position information relating to the user equipment the first and second base station operated so as to coordinately using a beamforming technique for transmitting the first and second positioning signal,*

[such that the user equipment is a first user equipment, wherein the wireless communications network comprises a second user equipment and such that the first base station transmits a third positioning signal so as to comprise the first sequence of the plurality of sequences and not the second sequence into a direction of the second user equipment; or]

such that the first base station transmits the first positioning signal so as to comprise a first sequence of a plurality of predetermined sequences for position signals into a direction of the user equipment, and such that the second base station transmits the second positioning signal so as to comprise the first sequence into a direction of the user equipment and such that the first base station transmits the first positioning signal to the user equipment during a first time interval and not during a second time interval following the first time interval, such that the second base station transmits the second positioning signal to the user equipment during the second time interval and not during the first time interval,*or*

*such that the user equipment is a first user equipment, wherein the wireless communications network comprises a second user equipment and such that the first base station transmits a third positioning signal so as to comprise the first sequence of the plurality of sequences and not the second sequence into a direction of the second user equipment,* when said computer program is run by a computer.

*26. A user equipment, UE, comprising:*

*a wireless interface for transmitting and/or receiving wireless signals;*

*wherein the UE is configured for operating in a wireless communication network in a positioning procedure;*

*wherein the UE is configured for:*

*receiving a positioning signal and determining a parameter of reception of the positioning signal, wherein the parameter of reception comprises:*

*a direction-of-arrival, DoA, of path components of an effective beam formed channel for transmitting the positioning signal for the positioning procedure; and*

*transmitting a response signal indicating information indicating the parameter of reception for a positioning of the UE*

*wherein the UE is configured for receiving the positioning signal as a first positioning signal and for determining the parameter of reception of the first positioning signal for a first step of the positioning procedure; and for receiving; for a later second step of the positioning procedure, a second positioning signal and for determining the parameter of reception of the second positioning signal; wherein the UE is configured for receiving the second positioning signal from a second beam that comprises a reduced width when compared to a width of a first beam used in the first step; or wherein the second beam is positioned more accurately when compared to the first beam by at least 5%.*

*27. The user equipment, UE, of claim 26, wherein the UE is configured for:*

*receiving the positioning signal from a base station and determining a parameter of reception of the positioning signal;*

*transmitting the response signal to the base station, the response signal indicating information indicating the parameter of reception.*

*28. The user equipment, UE, of claim 26, wherein the UE is configured for:*

*receiving the positioning signal from a base station and determining a parameter of reception of the positioning signal;*

*transmitting the response signal for a network node different from the base station and for the positioning procedure, the response signal indicating information indicating the parameter of reception.*

*29. The user equipment, UE, of claim 26, wherein the UE is to request the wireless communication network to determine its position; and*

*to receive the positioning signal based thereon; wherein the UE is to determine the parameter of reception of the positioning signal.*

*30. The user equipment, UE, of claim 26, wherein the UE is to receive the positioning signal and to determine the parameter of reception of the positioning signal, wherein the UE is configured for transmitting the response signal indicating information indicating the parameter of reception for a positioning of the UE as a signal being transparent for a receiving node.*

*31. The user equipment, UE, of claim 30, wherein the UE is to receive the positioning signal via a Line-of-Sight-Path and not via a non-Line-of-Sight path.*

*32. The user equipment, UE, of claim 30, wherein the UE is to receive, for determination of a fine position, a signal that is received from at least three different base stations.*

*33. The user equipment, UE, of claim 26, wherein the UE is configured for:*

*receiving the positioning signal and determining parameters of reception of the positioning signal, wherein the parameter of reception comprises:*

*an observed time difference of arrival, OTDoA, between the arrivals of different positioning signals received in a same frequency range; and*

*transmitting the response signal indicating information indicating the parameter of reception for a positioning of the UE.*

*34. The user equipment, UE, of claim 26, wherein the UE is configured for:*

*receiving the positioning signal and determining parameters of reception of the positioning signal, wherein the parameter of reception comprises:*

*a time of arrival, ToA, and/or time difference of arrival, TDoA, for positioning signals from different base stations; and*

*transmitting the response signal indicating information indicating the parameter of reception for a positioning of the UE.*

*35. The user equipment, UE, of claim 26,*

*wherein the parameter of reception comprises:*

*a parameter related to a quality or a loss along a path of a multitude of line-of-sight/non-line-of-sight-paths between the user equipment and a base station.*

*36. The user equipment, UE, of claim 26, being configured for receiving, for a determination of a fine position, the plurality of positioning signals comprising the positioning signal; wherein the UE is to determine a parameter of reception for each of the plurality of positioning signals and to report the parameter of reception.*

*37. The user equipment, UE, of claim 36, wherein each of the plurality of positioning signals is a different sequence out of a pool of sequences.*

*38. Wireless communications network comprising:*

*a user equipment;*

*a base station configured to control a wireless mobile communications network cell of a wireless mobile communications network;*

*wherein the base station is configured to use a coarse position information related to a coarse position of the user equipment, UE, to determine a direction towards the UE, characterized in that:*

*the base station being configured to transmit a positioning signal to the UE and to direct the transmission of the positioning signal towards the UE;*

*wherein the positioning signal is adapted to allow for a determining of a fine position information relating to the user equipment UE;*

*wherein the UE is configured for transmitting a response signal to a network node of the wireless mobile communications network; the response signal indicating information indicating a parameter of reception;*

*wherein the network node is configured to receive the response signal from the user equipment,*

*wherein a calculator of the wireless mobile communications network is adapted to determine the fine position information using the parameter of reception, wherein the calculator is configured to repeat determining of a position of the UE in subsequent steps, wherein the calculator is configured to use the fine position information of the UE determined in a first step as coarse position information in a second step following the first step.*

*39. The wireless communications network of claim 38, adapted to provide the position of the UE and/or a direction towards the UE to a network node of the wireless communications network.*

*40. A base station configured to control a wireless communications network cell of a wireless communications network; the base station comprising:*

*a wireless interface for transmitting and/or receiving wireless signals;*

*wherein the base station is configured to use a coarse position information related to a coarse position of a user equipment to determine a direction towards the user equipment;*

*wherein the base station is configured to transmit a positioning signal to the user equipment and to direct the transmission of the positioning signal towards the user equipment, using a technique that allows for transmitting the positioning signal into a first direction with a first, higher signal power when compared to a second direction into which the positioning signal is transmitted with a lower signal power;*

*wherein the positioning signal is adapted to allow for a determining of a fine position information relating to the user equipment;*

*wherein the base station is configured to receive a response signal from the user equipment, the response signal comprising data related to the positioning signal and indicating a parameter of reception of the positioning signal,*

*and providing the parameter of reception to a calculator of the wireless communication network for determining the fine position information using the parameter of reception, wherein the base station is configured to repeat transmitting the positioning signals for determining of a position of the user equipment in subsequent steps, wherein the base station is configured to use the fine position information determined by the calculator in a later iteration of determining the position of the UE.*

* * * * *